(12) United States Patent
Tsuji et al.

(10) Patent No.: US 7,987,246 B2
(45) Date of Patent: Jul. 26, 2011

(54) METHOD AND SYSTEM FOR CLIENT BROWSER UPDATE

(75) Inventors: Michael Tsuji, Roslyn Heights, NY (US); Hok Yee Wong, Hartsdale, NY (US); Mikhail Grinshteyn, New York, NY (US); Nikhil Minocha, Brooklyn, NY (US)

(73) Assignee: JPMorgan Chase Bank NY (US)

( * ) Notice: Subject to any disclaimer, the term of this patent is extended or adjusted under 35 U.S.C. 154(b) by 1772 days.

(21) Appl. No.: 10/154,129

(22) Filed: May 23, 2002

(65) Prior Publication Data
US 2003/0220989 A1    Nov. 27, 2003

(51) Int. Cl.
G06F 15/16    (2006.01)
G06F 15/177    (2006.01)

(52) U.S. Cl. ......... 709/220; 709/203; 709/206; 709/217

(58) Field of Classification Search .......... 709/203–204, 709/217, 220
See application file for complete search history.

(56) References Cited

U.S. PATENT DOCUMENTS

| | | |
|---|---|---|
| 3,872,448 A | 3/1975 | Mitchell, Jr. |
| 4,573,127 A | 2/1986 | Korf |
| 5,046,002 A | 9/1991 | Takashi et al. |
| 5,159,687 A | 10/1992 | Richburg |
| 5,168,444 A | 12/1992 | Cukor et al. |
| 5,202,986 A | 4/1993 | Nickel |
| 5,253,341 A | 10/1993 | Rozmanith et al. |
| 5,278,982 A | 1/1994 | Daniels et al. |
| 5,297,031 A | 3/1994 | Gutterman et al. |
| 5,313,616 A | 5/1994 | Cline et al. |
| 5,347,518 A | 9/1994 | Lee |
| 5,455,946 A | 10/1995 | Mohan et al. |
| 5,471,613 A | 11/1995 | Banning et al. |
| 5,471,629 A | 11/1995 | Risch |
| 5,600,836 A | 2/1997 | Alter |
| 5,630,118 A | 5/1997 | Shaughnessy |
| 5,630,173 A | 5/1997 | Oprescu |
| 5,644,762 A | 7/1997 | Soeder |
| 5,668,989 A | 9/1997 | Mao |
| 5,701,471 A | 12/1997 | Subramanyam |
| 5,719,826 A | 2/1998 | Lips |
| 5,737,735 A | 4/1998 | Soeder |

(Continued)

FOREIGN PATENT DOCUMENTS

WO    WO 95/03586    2/1995

(Continued)

OTHER PUBLICATIONS

Newton's Telecom Dictionary, 1999, pp. 702-703, Definition of "server".*

(Continued)

Primary Examiner — Joshua Joo
(74) Attorney, Agent, or Firm — Hunton & Williams LLP

(57) ABSTRACT

A method and system for browser notification of a change in browser information content and update of the browser information content. A browser establishes an http connection with a server and loads a web page with information content. At the same time, the server and client also establish a socket connection to pass messages from the server to the client over the socket connection. When the server determines that browser content needs update or has changed, the server sends a change notice message over the socket connection. Upon browser receipt of the change notice message, the browser initiates an refreshes the information content over the http connection.

12 Claims, 20 Drawing Sheets

U.S. PATENT DOCUMENTS

| | | | |
|---|---|---|---|
| 5,740,442 A | 4/1998 | Cox et al. |
| 5,748,878 A | 5/1998 | Rees et al. |
| 5,752,034 A | 5/1998 | Srivastava |
| 5,758,061 A | 5/1998 | Plum |
| 5,758,336 A | 5/1998 | Brady |
| 5,758,346 A | 5/1998 | Baird |
| 5,761,668 A | 6/1998 | Adamchick |
| 5,764,972 A | 6/1998 | Crouse et al. |
| 5,765,145 A | 6/1998 | Masiello |
| 5,765,155 A | 6/1998 | Nakamura |
| 5,774,553 A | 6/1998 | Rosen |
| 5,774,877 A | 6/1998 | Patterson, Jr. |
| 5,784,557 A | 7/1998 | Oprescu |
| 5,787,402 A | 7/1998 | Potter et al. |
| 5,794,048 A | 8/1998 | Brady |
| 5,797,117 A | 8/1998 | Gregovich |
| 5,806,063 A | 9/1998 | Dickens |
| 5,806,067 A | 9/1998 | Connor |
| 5,808,889 A | 9/1998 | Burgess |
| 5,809,500 A | 9/1998 | Nolan |
| 5,812,849 A | 9/1998 | Nykiel et al. |
| 5,828,883 A | 10/1998 | Hall |
| 5,828,890 A | 10/1998 | Rehbock et al. |
| 5,832,523 A | 11/1998 | Kanai et al. |
| 5,835,770 A | 11/1998 | Shum et al. |
| 5,835,909 A | 11/1998 | Alter |
| 5,838,979 A | 11/1998 | Hart et al. |
| 5,845,286 A | 12/1998 | Colizza |
| 5,845,293 A | 12/1998 | Veghte et al. |
| 5,852,824 A | 12/1998 | Brown |
| 5,872,976 A | 2/1999 | Yee et al. |
| 5,878,422 A | 3/1999 | Roth et al. |
| 5,897,633 A | 4/1999 | Nolan |
| 5,903,895 A | 5/1999 | Hoffman et al. |
| 5,907,846 A | 5/1999 | Berner et al. |
| 5,915,116 A | 6/1999 | Hochman et al. |
| 5,920,719 A | 7/1999 | Sutton et al. |
| 5,926,814 A | 7/1999 | Fridman |
| 5,930,506 A | 7/1999 | Bieler |
| 5,930,782 A | 7/1999 | Shaughnessy |
| 5,950,197 A | 9/1999 | Beam |
| 5,978,477 A | 11/1999 | Hull et al. |
| 6,009,405 A | 12/1999 | Leymann et al. |
| 6,012,087 A * | 1/2000 | Freivald et al. | 709/218 |
| 6,014,671 A | 1/2000 | Castelli et al. |
| 6,026,237 A | 2/2000 | Berry et al. |
| 6,029,002 A | 2/2000 | Afifi et al. |
| 6,029,175 A | 2/2000 | Chow et al. |
| 6,058,393 A | 5/2000 | Meier et al. |
| 6,065,009 A | 5/2000 | Leymann et al. |
| 6,081,808 A | 6/2000 | Blackman et al. |
| 6,108,698 A | 8/2000 | Tenev et al. |
| 6,125,390 A | 9/2000 | Touboul |
| 6,138,112 A | 10/2000 | Slutz |
| 6,138,158 A | 10/2000 | Boyle et al. |
| 6,145,121 A | 11/2000 | Levy et al. |
| 6,163,776 A | 12/2000 | Periwal |
| 6,167,534 A | 12/2000 | Straathof et al. |
| 6,188,400 B1 | 2/2001 | House et al. |
| 6,226,652 B1 | 5/2001 | Percival et al. |
| 6,237,143 B1 | 5/2001 | Fontana et al. |
| 6,243,862 B1 | 6/2001 | Lebow |
| 6,256,635 B1 | 7/2001 | Arrouye et al. |
| 6,263,121 B1 | 7/2001 | Melen et al. |
| 6,266,683 B1 | 7/2001 | Yehuda et al. |
| 6,269,479 B1 | 7/2001 | Puram |
| 6,279,008 B1 | 8/2001 | Tung Ng et al. |
| 6,301,701 B1 | 10/2001 | Walker et al. |
| 6,311,320 B1 | 10/2001 | Jibbe |
| 6,311,327 B1 | 10/2001 | O'Brien et al. |
| 6,336,122 B1 | 1/2002 | Lee et al. |
| 6,356,920 B1 | 3/2002 | Vandersluis |
| 6,377,691 B1 | 4/2002 | Swift et al. |
| 6,381,609 B1 | 4/2002 | Breitbart et al. |
| 6,385,618 B1 | 5/2002 | Ng et al. |
| 6,393,023 B1 | 5/2002 | Shimizu et al. |
| 6,397,221 B1 | 5/2002 | Greef et al. |
| 6,405,209 B2 | 6/2002 | Obendorf |
| 6,411,957 B1 | 6/2002 | Dijkstra |
| 6,418,446 B1 | 7/2002 | Lection et al. |
| 6,418,448 B1 | 7/2002 | Sarkar |
| 6,418,451 B1 | 7/2002 | Maimone |
| 6,446,062 B1 | 9/2002 | Levine et al. |
| 6,449,623 B1 | 9/2002 | Bohannon et al. |
| 6,453,310 B1 | 9/2002 | Zander |
| 6,456,995 B1 | 9/2002 | Salo et al. |
| 6,467,052 B1 | 10/2002 | Kaler et al. |
| 6,477,540 B1 | 11/2002 | Singh et al. |
| 6,490,581 B1 | 12/2002 | Neshatfar et al. |
| 6,502,095 B2 | 12/2002 | Breitbart et al. |
| 6,502,104 B2 | 12/2002 | Fung et al. |
| 6,532,467 B1 | 3/2003 | Brocklebank et al. |
| 6,535,894 B1 | 3/2003 | Schmidt et al. |
| 6,539,337 B1 | 3/2003 | Provan et al. |
| 6,539,383 B2 | 3/2003 | Charlet et al. |
| 6,539,397 B1 | 3/2003 | Doan et al. |
| 6,539,398 B1 | 3/2003 | Hannan et al. |
| 6,557,039 B1 | 4/2003 | Leong et al. |
| 6,564,048 B1 * | 5/2003 | Sugita | 455/414.3 |
| 6,571,249 B1 | 5/2003 | Garrecht et al. |
| 6,574,640 B1 | 6/2003 | Stahl |
| 6,578,129 B1 | 6/2003 | da Silva Junior et al. |
| 6,591,260 B1 | 7/2003 | Schwarzhoff et al. |
| 6,601,075 B1 | 7/2003 | Huang et al. |
| 6,624,761 B2 | 9/2003 | Fallon |
| 6,651,076 B1 | 11/2003 | Asano |
| 6,665,086 B2 | 12/2003 | Hull et al. |
| 6,678,705 B1 | 1/2004 | Berchtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,757,673 B2 | 6/2004 | Makus et al. |
| 6,763,384 B1 * | 7/2004 | Gupta et al. | 709/224 |
| 6,880,010 B1 * | 4/2005 | Webb et al. | 709/227 |
| 6,918,013 B2 * | 7/2005 | Jacobs et al. | 711/145 |
| 6,920,467 B1 | 7/2005 | Yoshimoto |
| 6,925,470 B1 | 8/2005 | Sangudi et al. |
| 6,934,934 B1 | 8/2005 | Osborne, II et al. |
| 6,938,072 B2 * | 8/2005 | Berman et al. | 709/214 |
| 6,961,731 B2 | 11/2005 | Holbrook |
| 7,010,757 B2 * | 3/2006 | Stana et al. | 715/823 |
| 7,043,496 B2 | 5/2006 | Yanagi |
| 7,103,556 B2 | 9/2006 | Del Rey et al. |
| 7,161,506 B2 | 1/2007 | Fallon |
| 7,246,263 B2 | 7/2007 | Skingle |
| 7,246,324 B2 | 7/2007 | Mikhail et al. |
| 7,249,095 B2 | 7/2007 | Davies et al. |
| 7,266,705 B2 | 9/2007 | Peck et al. |
| 7,266,839 B2 | 9/2007 | Bowers et al. |
| 7,275,066 B2 | 9/2007 | Priestley |
| 7,400,274 B2 | 7/2008 | Fallon et al. |
| 7,417,568 B2 | 8/2008 | Fallon et al. |
| 7,426,530 B1 | 9/2008 | Rosko et al. |
| 7,542,921 B1 | 6/2009 | Hildreth |
| 7,606,788 B2 | 10/2009 | Samar |
| 7,607,023 B2 | 10/2009 | Nakamura et al. |
| 7,630,879 B2 | 12/2009 | Liu |
| 7,680,731 B1 | 3/2010 | Davies et al. |
| 7,680,732 B1 | 3/2010 | Davies et al. |
| 7,801,814 B2 | 9/2010 | Cataline et al. |
| 2002/0007287 A1 | 1/2002 | Straube et al. |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0049666 A1 | 4/2002 | Reuter et al. |
| 2002/0065695 A1 | 5/2002 | Francoeur et al. |
| 2002/0083034 A1 | 6/2002 | Orbanes et al. |
| 2002/0091702 A1 | 7/2002 | Mullins |
| 2002/0116205 A1 | 8/2002 | Ankireddipally et al. |
| 2002/0124177 A1 | 9/2002 | Harper et al. |
| 2002/0143774 A1 | 10/2002 | Vandersluis |
| 2002/0144101 A1 | 10/2002 | Wang et al. |
| 2002/0178439 A1 | 11/2002 | Rich et al. |
| 2002/0188765 A1 | 12/2002 | Fong et al. |

| | | |
|---|---|---|
| 2003/0014421 A1 | 1/2003 | Jung |
| 2003/0018666 A1 | 1/2003 | Chen et al. |
| 2003/0027561 A1 | 2/2003 | Iyer |
| 2003/0046313 A1 | 3/2003 | Leung et al. |
| 2003/0050931 A1 | 3/2003 | Harman et al. |
| 2003/0069975 A1 | 4/2003 | Abjanic et al. |
| 2003/0070158 A1 | 4/2003 | Lucas et al. |
| 2003/0088593 A1 | 5/2003 | Stickler |
| 2003/0101116 A1 | 5/2003 | Rosko et al. |
| 2003/0120566 A1 | 6/2003 | Lipschutz et al. |
| 2003/0121008 A1 | 6/2003 | Tischer |
| 2003/0126151 A1 | 7/2003 | Jung |
| 2003/0131007 A1 | 7/2003 | Schirmer et al. |
| 2003/0140045 A1 | 7/2003 | Heninger et al. |
| 2003/0140308 A1 | 7/2003 | Murthy et al. |
| 2003/0145047 A1 | 7/2003 | Upton |
| 2003/0163603 A1 | 8/2003 | Fry et al. |
| 2003/0167266 A1 | 9/2003 | Saldanha et al. |
| 2003/0167445 A1 | 9/2003 | Su et al. |
| 2003/0177118 A1 | 9/2003 | Moon et al. |
| 2003/0177341 A1 | 9/2003 | Devillers |
| 2003/0191849 A1 | 10/2003 | Leong et al. |
| 2003/0217033 A1 | 11/2003 | Sandler et al. |
| 2003/0217083 A1 | 11/2003 | Taylor |
| 2003/0218633 A1 | 11/2003 | Mikhail et al. |
| 2004/0010699 A1 | 1/2004 | Shao et al. |
| 2004/0060006 A1 | 3/2004 | Lindblad et al. |
| 2004/0122872 A1 | 6/2004 | Pandya et al. |
| 2004/0153972 A1 | 8/2004 | Jaepel et al. |
| 2005/0027658 A1 | 2/2005 | Moore et al. |
| 2005/0060345 A1 | 3/2005 | Doddington |
| 2005/0065964 A1 | 3/2005 | Ziemann et al. |
| 2005/0065965 A1 | 3/2005 | Ziemann et al. |
| 2005/0065987 A1 | 3/2005 | Telkowski et al. |
| 2006/0100703 A1 | 5/2006 | Evans et al. |
| 2007/0192618 A1 | 8/2007 | Ellmore |
| 2007/0260706 A1 | 11/2007 | Skingle |
| 2008/0016180 A1 | 1/2008 | Bowers et al. |
| 2008/0177659 A1 | 7/2008 | Lacey |
| 2009/0299784 A1 | 12/2009 | Guller et al. |

FOREIGN PATENT DOCUMENTS

| | | |
|---|---|---|
| WO | WO 96/34350 | 10/1996 |
| WO | WO 02/46980 | 6/2002 |

OTHER PUBLICATIONS

Yu, et al., An Analysis of Several Software Defect Models IEEE Transactions on Software Engineering, vol. 14., No. 9, Sep. 1988.

Answers Corporation, definition of Schema, Synonyms from Answers.com, (www.answers.com/schema) and database schema—Information from Answers.com (www.answers.com/topic/database-schematechnology) (2008).

Chen, The Entity-Relationship Model—Toward a Unified View of Data, ACM Transactions on Database Systems, vol. 1, No. 1, pp. 9-36, Mar. 1976.

Computer Dictionary Online, Definition of Cache, retrieved from Computer-Dictionary-Online.org, 2 pages (2007).

Dingle, Web Cache Coherence, Computer Networks and ISDN Systems, vol. 28, Issues 7-11, p. 907 (1999).

McConnell, Gauging Software Readiness with Defect Tracking IEEE, May/Jun. 1997.

Hacigumus et al., Executing SQL Over encrypted Data in the Database-Service-Provider Model, ACM Sigmod, Madison, Wisconsin, pp. 216-227, Jun. 4-6, 2002.

Kosaraju, S.R., Efficient Tree Pattern Matching, 30th Annual Symposium on Foundations of Computer Science, pp. 178-183, ISBN-0-8186-1982-1, Oct. 30, 1989.

Li et al., Scalable Web Caching of Frequently Updated Objects using Reliable Multicast, 12 pages (1999).

Li et al., Time-Based Language Models, CIKM '03, Nov. 3-8, 2003, New Orleans, Louisiana, USA, ACM; pp. 469-475, Copyright 2003.

Microsoft Press Computer Dictionary, Third Edition, Definition of Cache (1997).

Programmer's Guide Monitor Client Library 12.5 Document ID 3286501-1250-01, Rev. May 2001 (http://manual.sybase.com/onlinebooks/group-as/asg1250c/clilib/ ....).

Deutsch et al., Storing Semistructured Date with Stored pp. 431-442 (1999).

Jagadish et al., TAX: A Tree Algebra for XML University of Michigan, Ann arbor, MI pp. 149-164 (2002).

Jagadish et al.., TIMBER A native XML database The VLDB Journal (2002) pp. 274-291 Published Online Dec. 19, 2002.

Wang et al., A System for Approximate Tree Matching, IEEE Transactions on Knowledge and Data Engineering, vol. 6, No. 4, Aug. 1994, pp. 559-571.

White, How Computers Work, 4th Edition, Sep. 1998.

Zaki, Efficiently Mining Frequent Trees in a Forest, SIGKDD 2002 Edmonton, Alberta, Canada, Jul. 23-26, 2002.

Duggan, 2.40 General—Reviews and Abstracts, SPI Database of Software Technologies, p. 1-5, Feb. 1, 1974.

Hellerstein, A Generalized Search Tree for Database Systems, Jan. 19, 1996.

Deng et al., A Probabilistic Approach to fault Diagnosis in Linear Lighwaves Network, Department of Electrical Engineering, May 1992, pp. 1-122.

VanBommel, Genetic Algorithms for Optimal Logical Database Design Information and Software Technology, vol. 36, No. 12, p. 725-732, 1994.

Strom et al., Gryphon: An Information Flow Based Approach to Message Brokering, International Symposium on software Reliability, Jun. 20, 2005.

Hilbert, Hilbert, et al., An Approach To Large Scale Collection Of Application Usage Data Over the Internet, Software Engineering 1998, Proceedings of the 1998 International Conference, Abstract, Apr. 1998.

Chen et al., Improving Index Performance through Prefetching School of Computer Science Carnegie Mellon University, Dec. 2000.

Quantitative Monitoring Of Software Development by Time-Based and Intercheckpoint Monitoring, Software Engineering Journal, vol. 5, Iss. 1, p. 43-49, Abstract, Jan. 1990.

Moser, Transactions in a Distributed Object Environment, Department of Electrical and Computer Engineering, Jun. 19, 2005.

\* cited by examiner

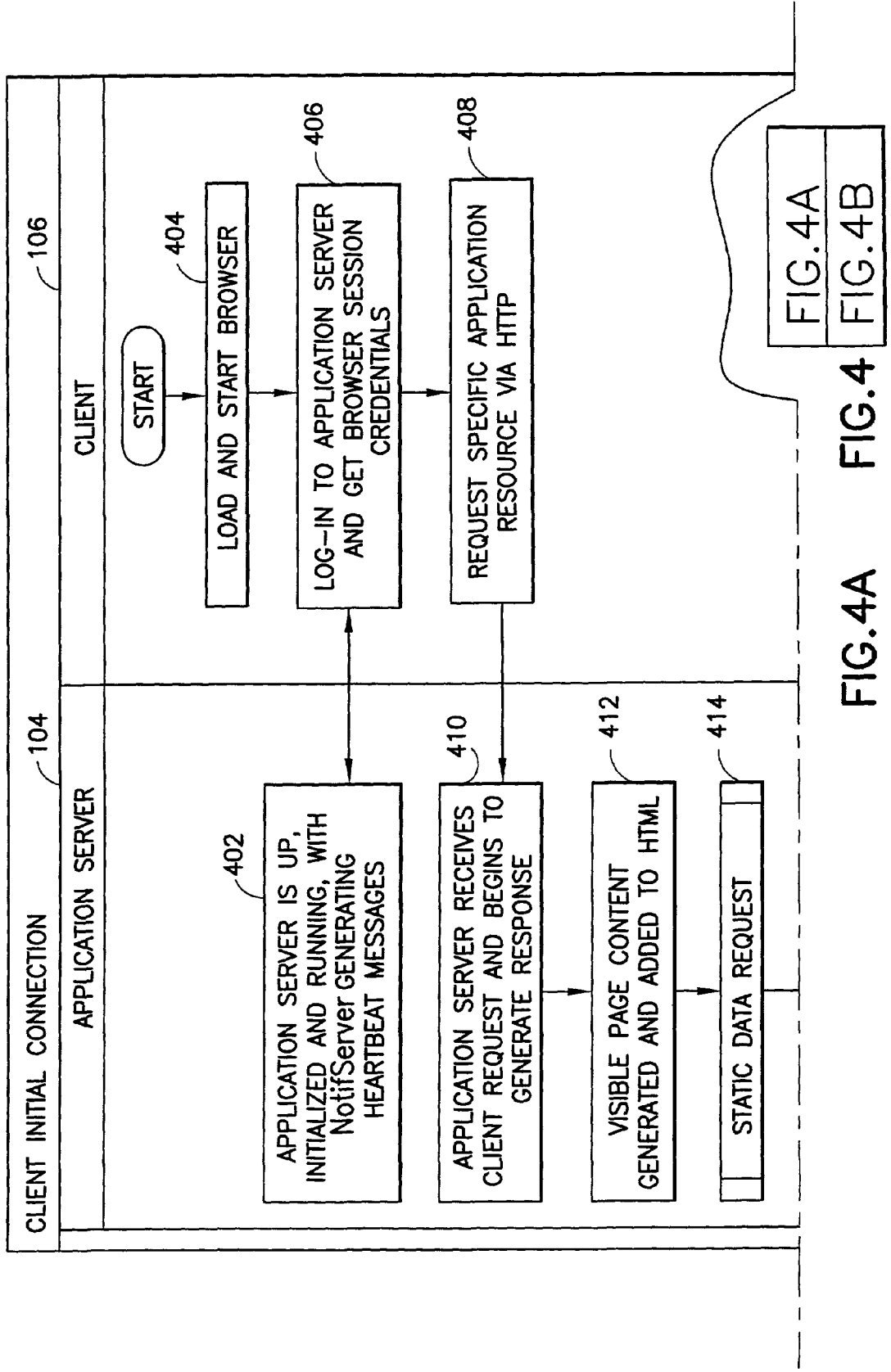

METHOD AND SYSTEM FOR CLIENT BROWSER UPDATE

BACKGROUND

1. Field of the Invention

The present invention relates to multi-computer network interaction, and more particularly to networked client-server architectures.

2. Description of the Related Art

In client-server computing and enterprise architectures, data caching is known. What is needed is a method and system to provide data cache of information that is routinely required, and adding data cache based on query.

In client-server computing and enterprise architectures, periodic browser content refresh is known. What is needed is a method and system to provide browser content refresh that is based on change of the underlying data, rather than an arbitrary refresh cycle such as time.

In client-server computing and enterprise architectures, techniques for validation of data entry are known. What is needed is an efficient method and system to validate data entry of static and dynamic data before submission of a trade or transaction.

The preceding description is not to be construed as an admission that any of the description is prior art relative to the present invention.

SUMMARY OF THE INVENTION

In one embodiment, the invention provides a method and system for changing information on a client computer. The method comprises establishing a first connection between the client and a first server; responsive to a request from the client to the first server, sending a set of data to the client; establishing a second connection between the client and a second server; sending a message from the second server to the client over the second connection; and responsive to the message, automatically sending a request from the client to the first server over the first connection for a change in the set of data. data display on a client computer.

In one embodiment, the invention provides a method and system for changing information on a client computer. The method comprises establishing an http connection between the client and an application server; establishing a TCP connection between the client and a notification server; responsive to a resource request from the client, sending an html file via the http connection to the client, the html file reflecting data at a first time; responsive to a change in data after the first time, sending a message from the notification server to the client via the TCP connection; and responsive to the message, sending a request from the client to the application server via the http connection for the changed data.

BRIEF DESCRIPTION OF THE DRAWINGS

The foregoing features and other aspects of the invention are explained in the following description taken in conjunction with the accompanying figures wherein:

FIGS. 4A and 4B illustrate steps in a method according to one embodiment of the invention;

It is understood that the drawings are for illustration only and are not limiting.

DETAILED DESCRIPTION OF THE DRAWINGS

Figure 1:
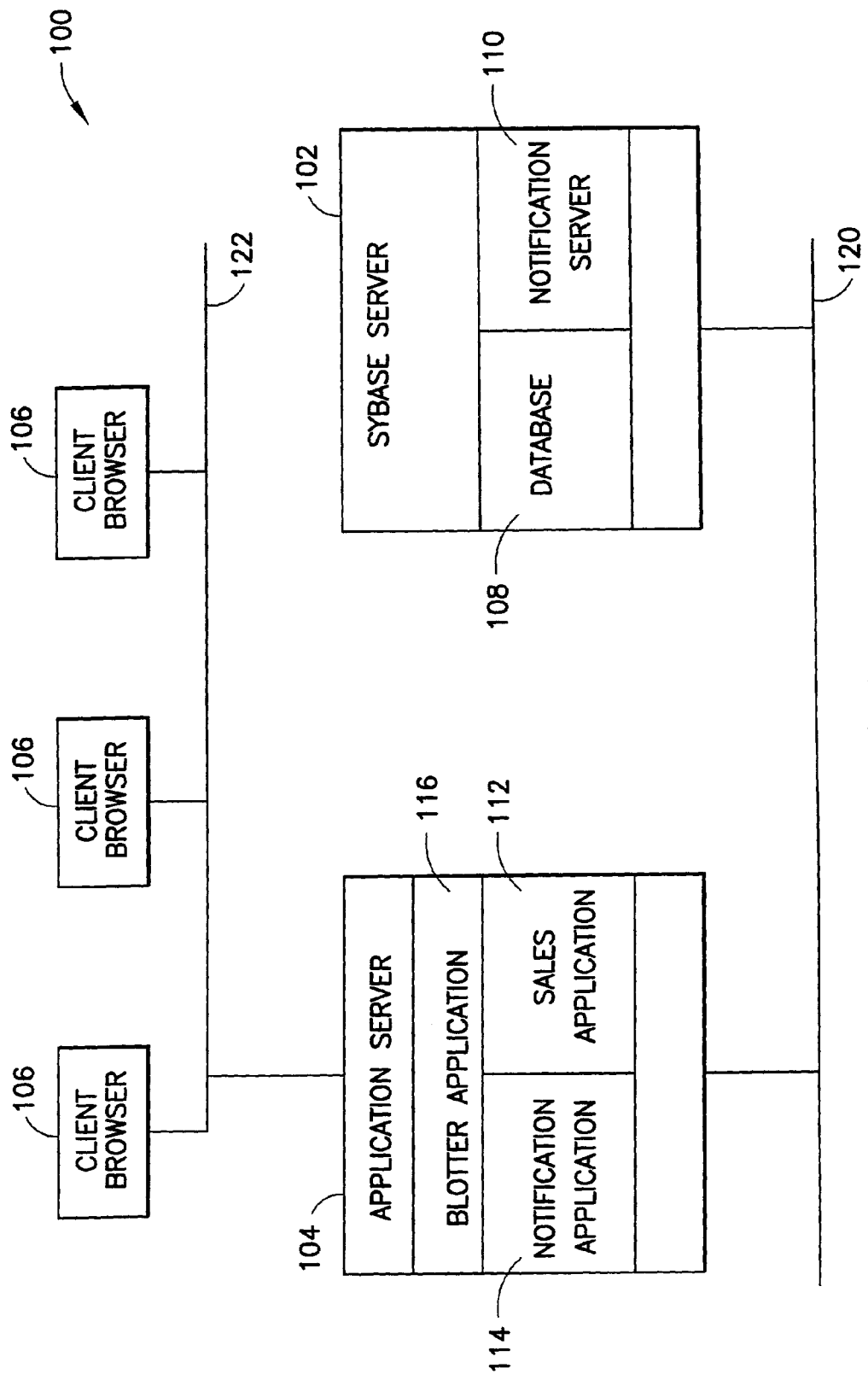
FIG. 1 illustrates an overview of a system according to one embodiment of the invention.

Referring to FIG. 1, one embodiment of system 100 of the invention includes a Sybase server 102 connected to application server 104 by network 120. Client 106 with a browser application is connected to application server 104 by network 122. In one embodiment, network 122 is the Internet. Network 120 may also be the Internet, or it may be a private network, such as a LAN or WAN. Although not illustrated in the figure, it is possible for Sybase server 102 to be connected to client 106 by network 122. However, for security and interoperability reasons, it is more common for client browser 106 to have access to Sybase server 102 only thru application server 104. Sybase server 102 includes multiple programs or applications, such as Sybase database 108 and a notification server 110. Application server 104 also includes multiple programs, such as trading applications 112, 116 and notification application 114.

Throughout the embodiments described in this description, server 102 is referred to as Sybase server 102. Sybase is a particular server brand, available from Sybase Inc. of Berkeley Calif., and there is nothing particularly unique about a Sybase server that limits server 102 to only a Sybase server.

For many businesses and organizations, a large portion of their information processing and management, which is integral to their day-to-day operations, uses web-based application components. For these businesses and organizations, providing uniform standards and services for those web-based application components is very important. Uniform standards and services allow application developers to focus on development, deployment and maintenance of applications without re-creating common components that are frequently used by other applications. Uniform standards and services also provide a more consistent user interface for the various web-based applications.

Figure 13A:
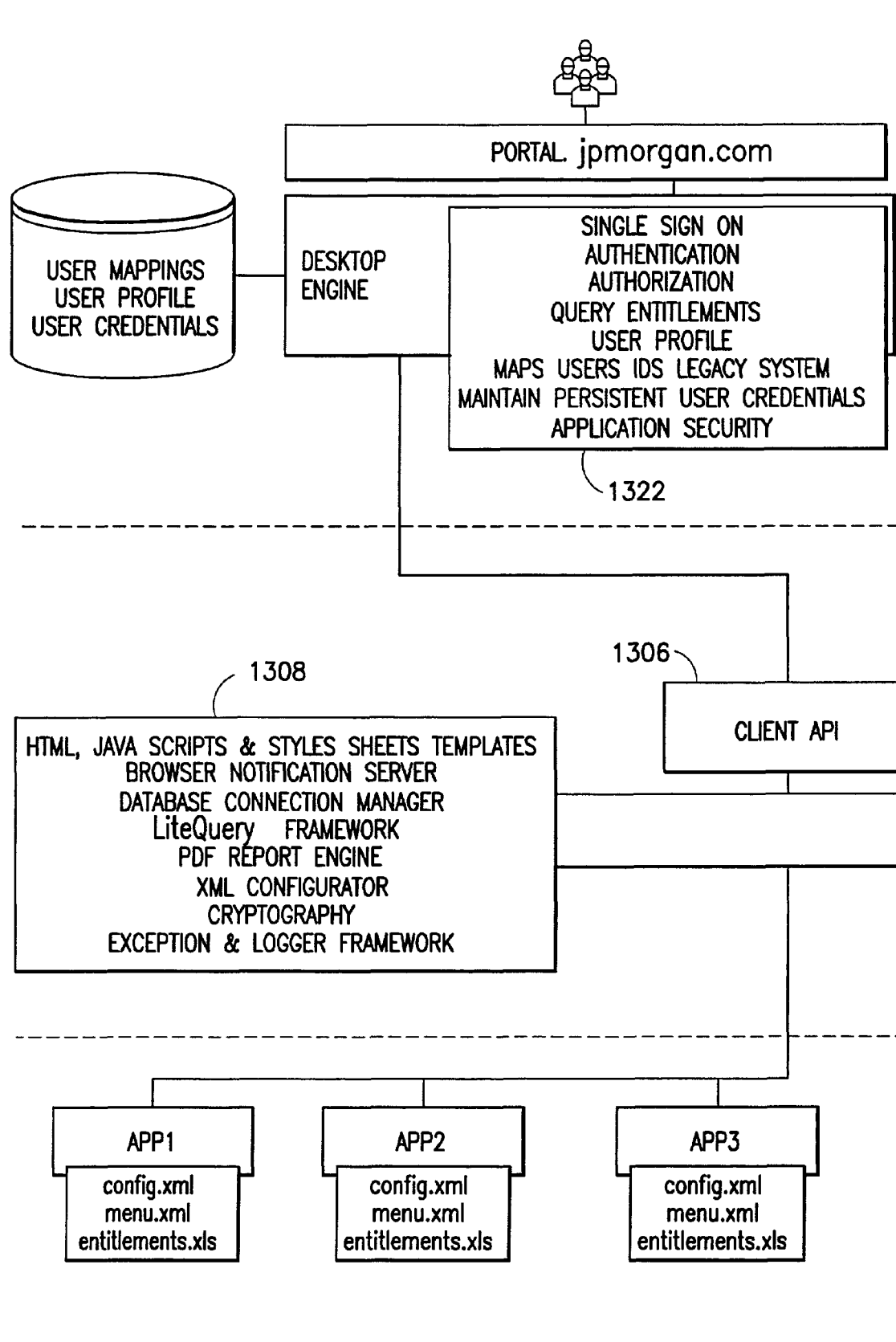
FIGS. 13A and 13B illustrate interactions of various aspects of the invention.
Figures 13, 13B:
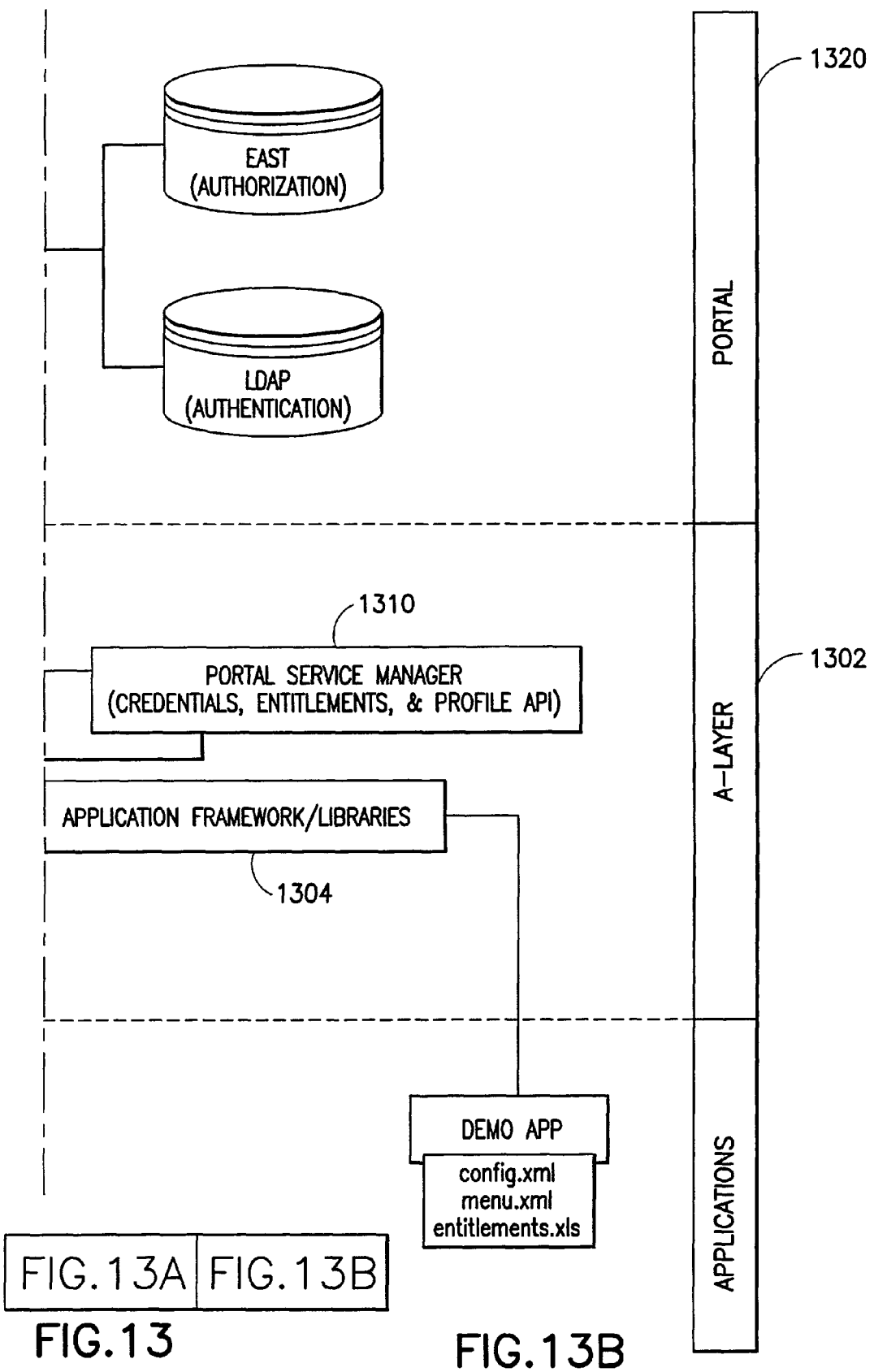
Figure 14A:
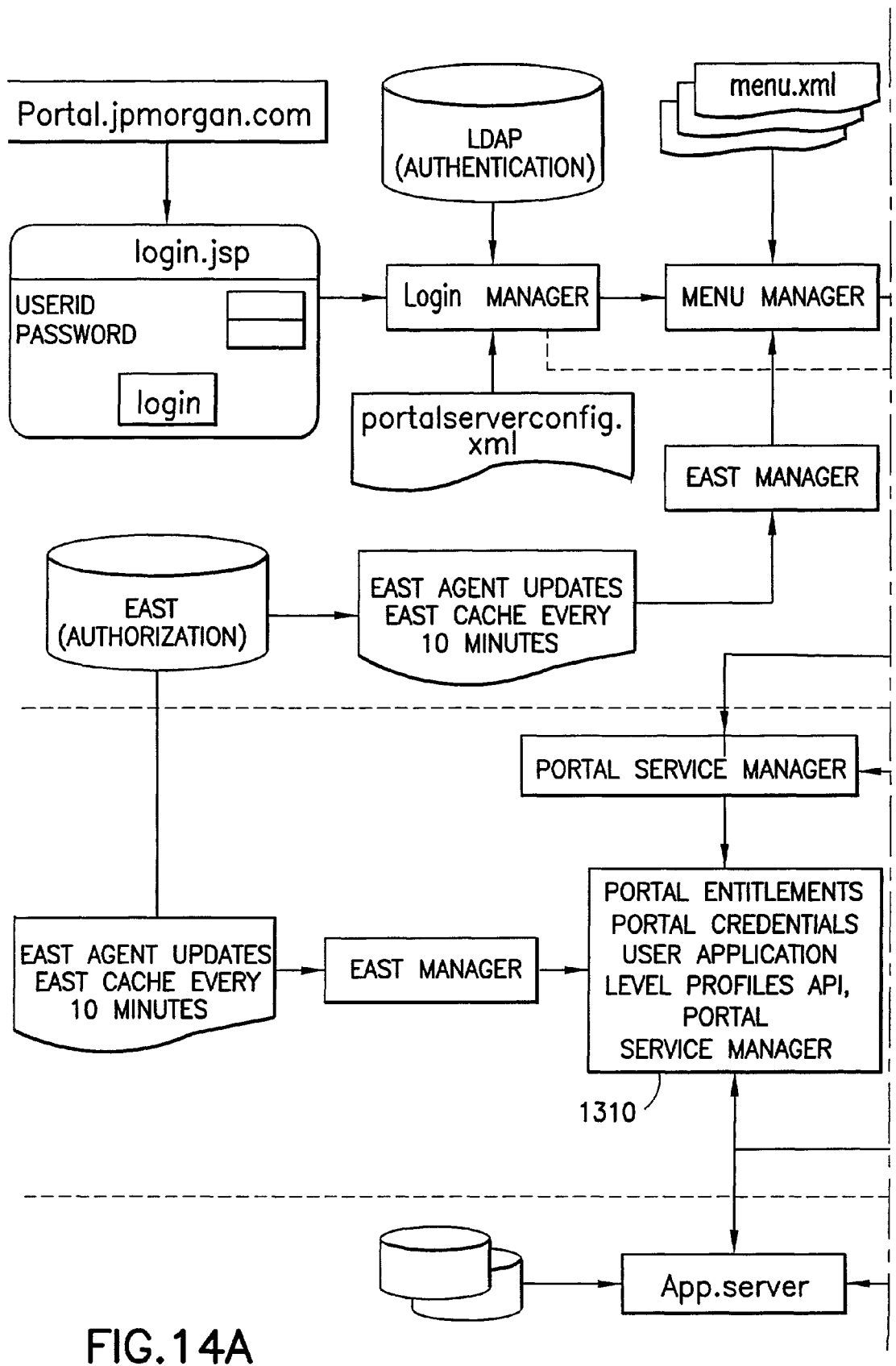
FIGS. 14A and 14B illustrate interactions of various aspects of the invention.
Figure 14:
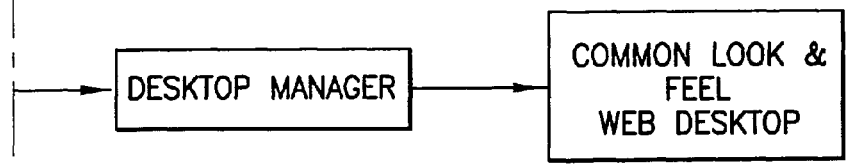

The following is an overview and description of two major architectural components that encompass aspects of the invention. These two major architectural components (A-LAYER and PORTAL) are illustrated in FIGS. 13 and 14 and described below. As an example, the description below uses a trading environment. However, there is no requirement that the embodiments only apply in a trading environment. It should also be noted that although the various embodiments are described and illustrated in the context of an enterprise architecture, there is nothing that requires an enterprise architecture.

I. Architectural Layer ("A-LAYER") A-LAYER (1302) contains two main components: an Application Framework ("FRAMEWORK") (1304) and a Client API (1306).

A. FRAMEWORK The Application Framework (1304) is a group of ten services and standards (1308) to help develop applications that a user can launch from PORTAL. These services and standards are: (1) HTML Templates; (2) JavaScript Templates/Libraries; (3) Cascading Style Sheets; (4) Browser Notification Service; (5) Database Connection Manager; (6) LiteQuery Framework; (7) PDF Report Engine; (8) XML Configurator; (9) Cryptography; and (10) Exception & Logger Framework.

(1) HTML Templates Realizing that many applications will utilize the same types of screens (search, deal entry, blotter), a set of HTML templates are assembled. These templates contain all formatting and setup for standard screen types. This includes the use of JavaScript functions, Style Sheets as well as the general layout. By using the HTML templates, an application developer can maintain the same look and feel across applications.

(2) JavaScript Templates/Libraries JavaScript is used extensively throughout the applications that use PORTAL. In order to assist rapid application development and standardize re-usable code, a JavaScript Library is established containing a standard set of JavaScript Functions. The library includes, but is not limited to, functions that perform the following: (i) Layer creation; (ii) Launching Pop-Up Windows; (iii) Date formatting depending on location; (iv) Menu creation; (v) Form submission for hidden JSPs; (vi) Shortcuts for data entry; (vii) Rounding; (viii) List box for options; (ix) Row Selection; and (x) Auto-completion in entry fields using data sets in hidden JSPs. In order to assist in standardizing code layout, templates are also available for writing functions that are more specific to a given application.

(3) Cascading Style Sheets To standardize the look and feel for all applications that are launched through PORTAL, FRAMEWORK provides a common Cascading Style Sheet ("CSS") file that all applications can call. PORTAL implements the use of CSS 2.0. Examples of the types of tags that are included in the PORTAL CSS, include but are not limited to, tables, backgrounds, font sizes, and types, alternating rows, negative and positive numeric formatting and alignment.

(4) Database Connection Manager The A-LAYER connection manager is used by applications to connect to application databases. It uses the PORTAL framework to retrieve database specific user id's mapped to single sign-on user id. The Connection Manager queries the PORTAL user ID mapping Database to acquire database id's.

The A-LAYER connection manager is available for use in two forms. In situations where a specific database connection needs to be established under a specific user's name, a dedicated connection is associated to the user. The same connection is used for that user until the session expires.

The second form of A-LAYER connection manager supports a connection pooling methodology. The server creates a group of connections, which are available upon request. These connections are reusable among all authorized users. A typical example could be a reporting tool wherein the application does not demand specific database user id's to connect to the database.

The connection manager will automatically expire, or time-out, connections that have been unused for a specific period of time. The time limit is a configurable variable. It does this by starting up a "connection vulture" to periodically examine each connection that the connection manager monitors, and disconnect those connections that have been unused for a specified amount of time, or have been open for longer than the configured limit.

Where an application is not required to stamp a transaction or request with a specific user id for auditing purposes, the connection pooling method is recommended. One reason is that database connections are an expensive overhead and may result in reducing server performance.

(5) Browser Notification Service One objective of the Browser Notification Service is to use existing notification programs to keep viewed data on the client as up to date as possible. A second objective is to keep the implementation as simple as possible.

For each Sybase notification to be handled, the application server creates at least one Java bean. The bean registers itself with the Sybase notification server, specifying a callback method for the desired notification. When notified, the callback method retrieves the parameters passed by the Sybase notification server and, in turn, passes them to a stored procedure to fetch the updated data. The updated data is then stored in a vector in the bean along with a timestamp. This data remains alive in the vector for a period of time, such as five minutes. The vector is periodically examined inside a thread, such as every minute. Any data older than the specified time is deleted. (Note that Vector has synchronized methods.)

From the client, an applet in a hidden frame establishes a socket connection with a notifier object in the application server. This notifier object in the application server sends out a heartbeat every ten seconds in the form of a string message ("heartbeat"). When the viewed data changes, the notification bean in application server 104 informs the notifier object that it has received a change or update notification; this causes the notifier object in the application server to change ("refresh") the text of the heartbeat message. Client JavaScript continuously monitors the text of the heartbeat message. When the client JavaScript determines that the heartbeat message has changed, it triggers another hidden JSP within the client to call the application server to fetch the vector of notifications. Other client JavaScript functions then update the user's view of the data.

Three classes are implemented for Notification. They are a factory for creating a notification manager, the notification manager itself, and an abstract class that all notification beans should subclass from. Any application developer that wants to add a notification bean need only extend the abstract class and implement three methods. An application developer thus only needs to be concerned with the three methods that they have implemented.

(6) LiteQuery Framework

Background When implementing two-tier client-server systems using an object-oriented language (e.g., C++, Smalltalk or JAVA) for the client, and a relational database (e.g., Sybase or Oracle) for the server, a standard design issue is the conversion of relational data to objects (and vice-versa). The usual implementation uses a query to draw the data into the client whereupon the client can then process the result set. Each row of the result set becomes the set of values for initializing the instance variables of the newly created object.

After years of object-oriented development, this implementation has several well-known drawbacks. These drawbacks include: data traffic is typically heavy; the client requires a large amount of memory; and set up times can be long.

In designing the LiteQuery Framework it was noted that stored procedures in legacy databases return more data than the view (as in Model-View-Controller) typically requires.

This in turn results in full-blown, "heavy" objects that quickly eat up client memory. Finally, as business grows from several hundred assets and counterparties to thousands, initializing thousands of asset and counterparty objects requires long set up times.

LiteQuery Basic Design The LiteQuery is designed to be used by multi-tier applications that employ HTML/JSPs, servlets, and application server and legacy database technologies. One design objective is to eliminate the three problems mentioned above. In one embodiment, the application server acts as a "client" to the legacy database server. It is recognized that the view, typically a trade entry screen or a search screen written as HTML/JSP, requires only two entities: a display string and a key.

Considering the case when a user enters a trade and the user selects an asset or counterparty. The typical user, when selecting an asset or counterparty, is only interested in the name of the asset or the counterparty. The view therefore requires only a display string. When saving the trade, the application requires a unique identifier for the asset or counterparty, typically the database primary key.

This is ideal for HTML/JSPs since the display string is what is presented to the user, and the key is the value that is passed to the servlet for processing.

Recognizing this, in one embodiment, A-LAYER implements a LiteQuery Framework. When queried, the LiteQuery Framework returns the display string and key. If more complete information is required for an asset or counterparty, the application server requests that data from the database using the primary key. This data is therefore drawn into the application only as needed.

LiteQuery Caching and Initialization The LiteQuery Basic Design that is described above significantly improves the memory requirements for assets and counterparties, and reduces the amount of data traffic. If, however, the LiteQuery Framework must go to the database each time the user requires a complete list of assets and counterparties, significant delays will be encountered. In other embodiments, the LiteQuery Framework solves this in two ways.

First, the data is cached in the application server's memory. When a user requests a set of assets or counterparties, the query is directed to the cache and not to the database.

Second, all asset and counterparty data is initialized into the cache during the application server startup. A special servlet, the LiteQueryManagementServlet, is created for this purpose. In the initialization (init( )) routine, which is called when the application server starts up, the cache is initialized. This loading process therefore never impacts the client user. When the Web server and application servers are available for client use, the cache has been initialized.

LiteQuery Cache Refresh During the period in which the application servers are up and running (which can be several days or weeks), assets or counterparties may be created or inactivated. Asset and counterparty data in cache therefore may become stale. To solve this problem, a thread is started at the time the application server is initialized that will refresh the cache. In one embodiment, this thread executes every ten minutes; this value is determined by a setting in a system configuration file (XML file). During this ten-minute period, it is possible that a user will not see a newly created counterparty or realize that a counterparty has been inactivated.

(7) PDF Report Engine The Report Engine uses the ITEXT (freeware) library as a base for creating both canned and slice and dice reports. The libraries are extended to include extra reusable functionality such as including functions for totals, truncations for numeric values as well as text values. The engine takes a data array, which is saved as a JAVA object that is returned from a stored procedure. It then uses the defined formatting and applies that to the data for presentation in a PDF file. PDF files are auto-launched from the browser and can be printed or saved from Adobe. This allows the users the ability to fax, store, or e-mail the report.

(8) XML Configurator The XML Configurator is a service that allows applications running off of PORTAL to configure their applications with information regarding where their database is located, where the application server is located, etc. Included in the Configurator are a number of JAVA classes that use the XML file to configure the application.

(9) Cryptography PORTAL offers an RSA library tailored for PORTAL applications, which allows an application developer to use 128-BIT encryption to store data. The types of data that this can be used for are the encryption of session information, and user id's that are stored in memory. This service provides a greater level of security to which only the PORTAL Cryptography Service maintains the encryption key.

(10) Exception & Logger Framework The Exception & Logger Framework provides the service of allowing a POR-TAL application to store exceptions and logs in daily file sets as opposed to being overwritten on a daily basis. It is configurable to allow an application developer to decide the length of time these files will be kept before being overwritten, or discarded. It provides the application developer with the ability to archive exceptions over a longer period of time.

The Exception & Logger Framework also provides the ability to store audit and transactional history. By using the provided classes and methods, an application developer can keep track of critical events within an application as audit user specific transactions.

Certain processes or queries run as an application, as opposed to by a particular user. For these types of transactions most applications have a generic read only id that can connect to the database. PORTAL also maintains these accounts within PORTAL.

B. Client API The Client API (1306) provides an interface for PORTAL Credentials, PORTAL Entitlements, User application level profiles API, and the PORTAL Service Manager (1310).

(1) PORTAL Credentials The Client API provides client Applications with the ability to pass a user's token to the API and receive back the credentials for that user as described below in Maintaining Persistent User Credentials.

(2) PORTAL Entitlements The Client API provides client applications with the ability to query user entitlements from EAST. EAST is a security framework built on IBM Policy Director and LDAP. EAST also provides information regarding PORTAL entitlements to the client applications.

(3) User application level profiles API The API for application level profiles allows an application to access user profile information saved with PORTAL. User profiles include the saving of different profiles per screen of displayed data.

(4) PORTAL Service Manager The PORTAL Service Manager is an application administrator's console that is launched from within PORTAL. The console allows an application developer or administrator to: (i) Reload their XML application configuration files; (ii) Notify and request automated upload of a new menu XML file by PORTAL; (iii) View user level entitlements to troubleshoot if users were set up correctly in the system; (iv) Check Application entitlements against EAST; (v) Check stored session information; (vi) Check to see the number of active users; and (vii) Check to see the number of users logged in but not actively using the application.

II. Web-based Applications Portal ("PORTAL") PORTAL offers eight services (1322) that can be used by application developers to manage and deploy their applications. These services are: (1) Single Sign-On; (2) Authentication; (3) Authorization; (4) Query Entitlements; (5) User Profiles; (6) Mapping of User Ids to legacy systems; (7) Maintain Persistent User Credentials; and (8) Application Security.

(1) Single Sign-On (SSO) SSO is a security framework, which allows an application developer to add authentication (determining the identity of a user) and authorization (what is the user allowed to access) to any web based application. The concept of the single sign-on is to map several application user id's and passwords to one PORTAL user id and password. For this reason, the first time that a user signs-on to PORTAL, when they attempt to access an application, they will have to enter that application's user id and password. On following attempts, once they have signed-in to PORTAL, they will automatically have access to the other applications that they use.

In addition, the SSO framework uses an entitlements-based approach to security. Entitlements get assigned to groups of users. Entitlements also get assigned to resources, for example JSP pages or a component of an application.

(2) Authentication Authentication is the process of uniquely identifying a user. PORTAL receives the user's credentials (evidence of identity by supplying a user id and password), validates the credentials, and returns a distinguishing unique identifier for the user (stored in the user's session information). In one embodiment, Lightweight Directory Access Protocol ("LDAP") is used for authentication. A set of rules is defined which guides the limits on user authentication attempts, and storing of user id and passwords.

(3) Authorization/Entitlements Authorization allows a user with a defined role to access a given resource (page, user defined or application component). PORTAL uses EAST entitlements to carry out authorization. Once an application has registered it's entitlements in EAST, the application queries the PORTAL client API, and entitlement information is returned.

(4) User Profiles Because some client applications do not store any information in their legacy databases, and only make queries against the databases, PORTAL provides the ability to store user profile information in a centralized PORTAL database. Each profile is stored as a single binary record per user profile. Applications can call these profiles through the Client API layer in A-LAYER. A common JSP tag is provided though the FRAMEWORK component in A-LAYER, such that all profile management screens are the same regardless of which application is being accessed.

(5) Mapping of User Ids to Legacy Systems By providing the single sign-on ability, PORTAL also provides a database in which to store encrypted pairs of user id's and passwords for each user. Each user id and password that is stored in the database is encrypted using 128 bit-encryption using a key generated by EAST and Security Access.

(6) User Credential Persistence When a user signs-in to PORTAL, EAST returns an EAST object, which is used to check user entitlements. This EAST object is stored in a PORTAL token and passed to the browser with the following information: PORTAL ID, Session expiry time is configurable through XML, and the user's IP address. When a user first attempts to access a client application in PORTAL, the application gets the token from the user's browser with the request. The application uses this token to make a request to the PORTAL API for a credential for that user.

(7) Application Security There are certain processes or queries that are run as an application as opposed to by a particular user. For these types of transactions, most applications have a generic read only id that can connect to the database. PORTAL also maintains these accounts within PORTAL.

The two major architectural components (PORTAL & A-LAYER) are designed such that a developer deploying an application through PORTAL does not require the FRAMEWORK component of A-LAYER. Instead, they can use the Client API component of A-LAYER, and connect directly to PORTAL.

Having described the various embodiments of the invention in somewhat general detail in the context of an enterprise, a more detailed description of particular aspects of the invention is provided below.

Figure 2A:
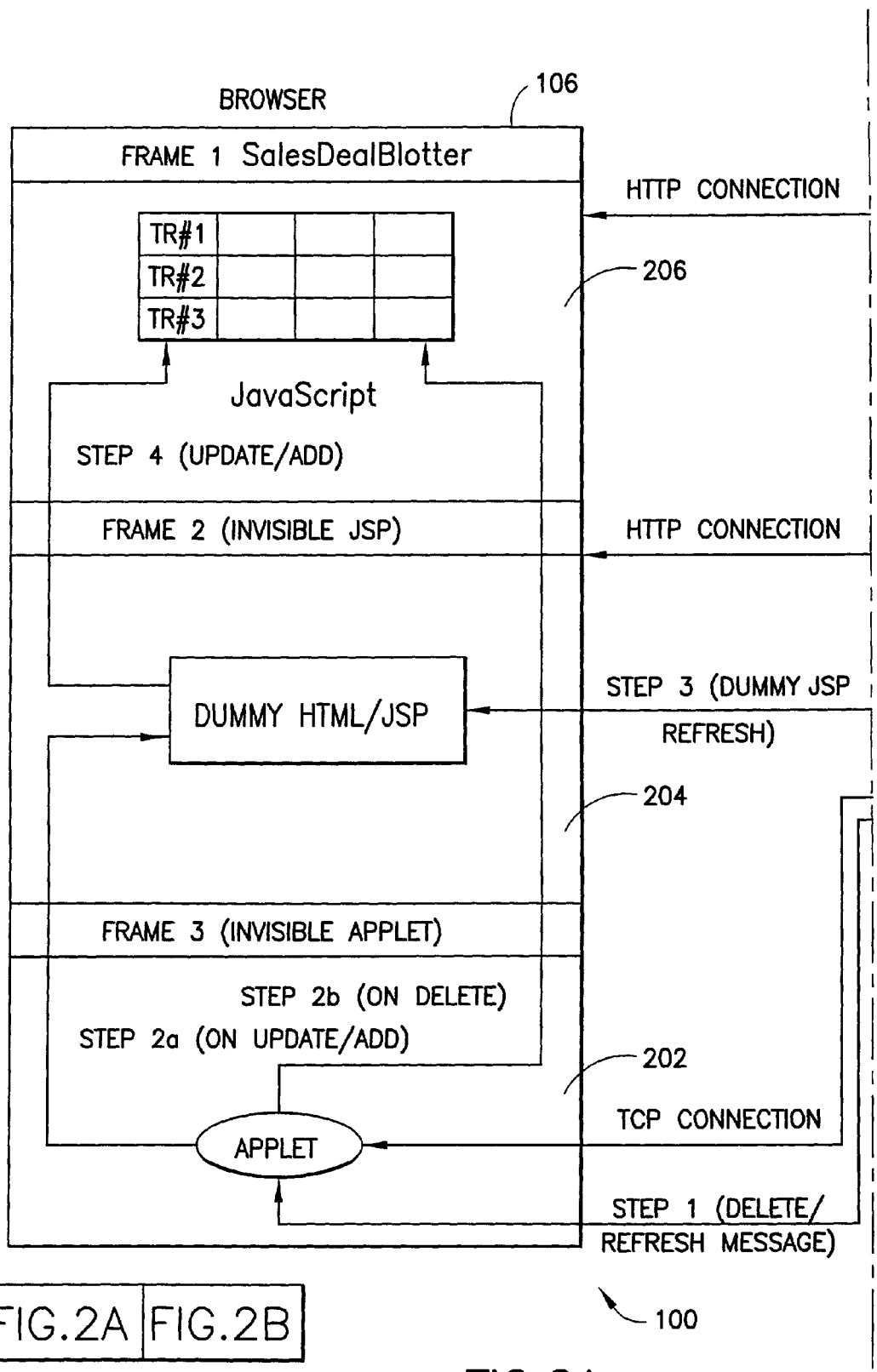
FIGS. 2A and 2B illustrate interactions of elements of a system according to one embodiment of the invention.
Figure 2B:
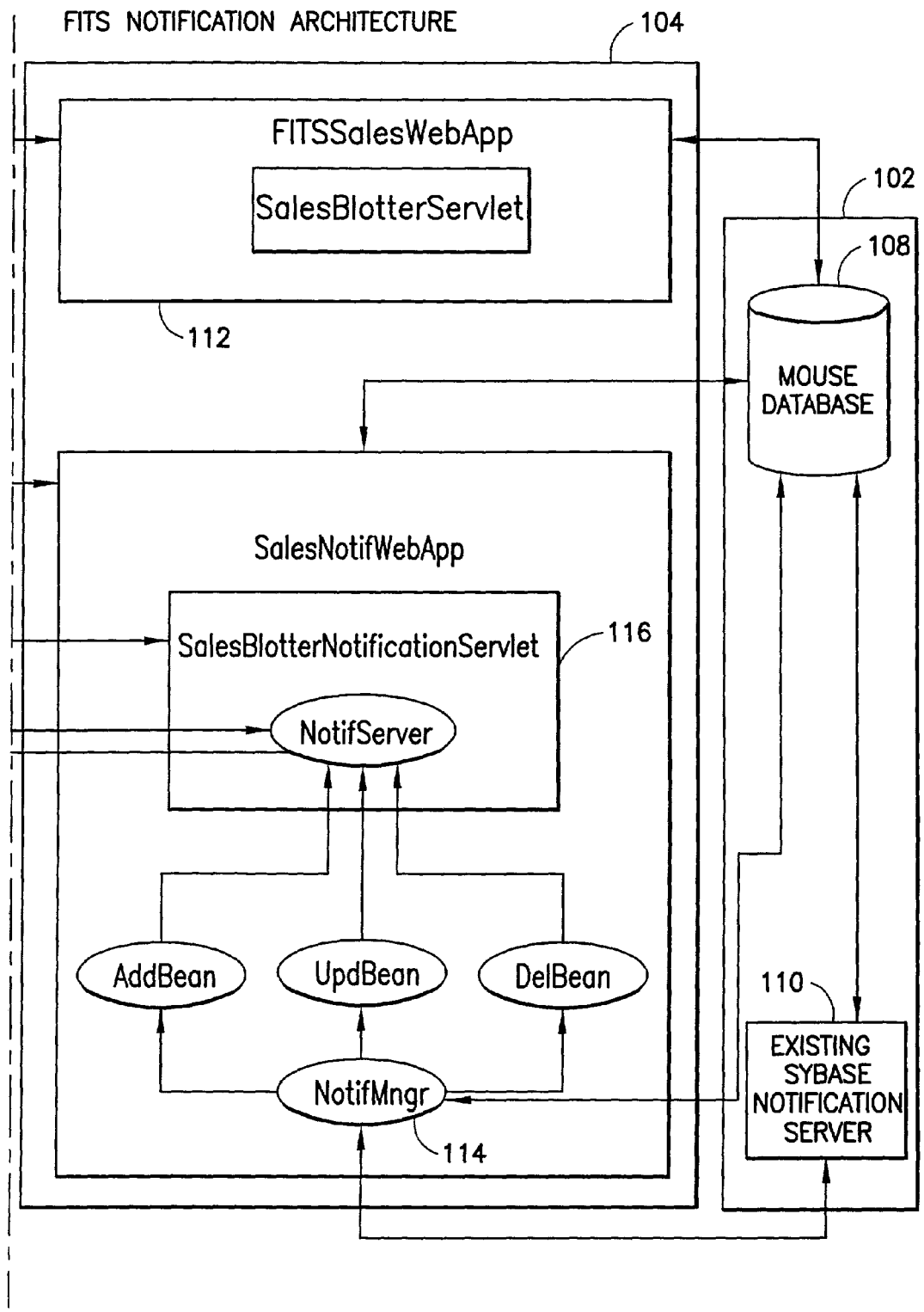
Figure 3:
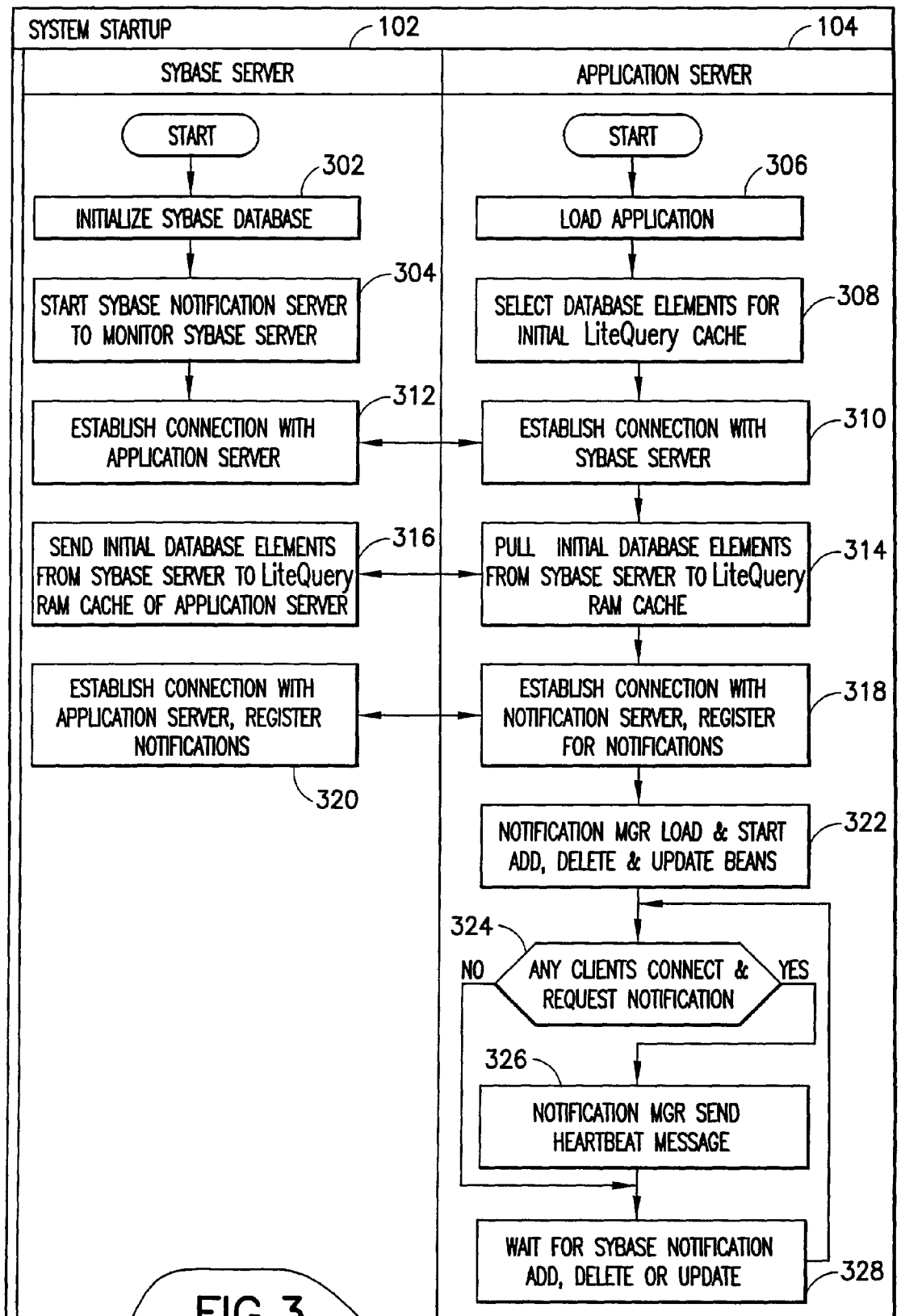
FIG. 3 illustrates steps in a method according to one embodiment of the invention.

Referring to FIGS. 1, 2 and 3, during startup of system 100, Sybase server 102 and application server 104 perform various initialization steps. Many of these steps are not relevant to the invention, but some steps do have relevance to the invention and those steps are described below.

At step 302, Sybase server 102 initializes the Sybase database 108.

At step 304, Sybase server 102 starts the notification server 110.

At this point, the Sybase server is ready for connections from application server 104.

At step 306, application server 104 loads applications 112 and 116.

At step 308, application server 104 determines the data elements that should be included in the initial LiteQuery cache.

At steps 310, 312, application server 104 and Sybase server 102 establish a connection.

At steps 314, 316, the initial data elements for the LiteQuery cache are pulled from Sybase server 102 to the LiteQuery cache of application server 104. It is also possible that instead of being pulled, the data elements are sent from Sybase server 102 to application server 104.

In one embodiment, upon start-up of the application server, only three caches are started. The caches are for assets, non-emerging market assets and counterparties. All other caches, such as countries and currencies are lazily initialized. Lazy initialize means that the cache is not initialized until a client requests information that would be in the cache. This is illustrated generally in FIG. 5. The types of data held by the LiteQuery caches are typically relatively static elements. For example, caches may be created for parties, counterparties, and currencies. Because the data is relatively static, moment by moment synchronization between the LiteQuery cache and the underlying Sybase database is not essential. However, if the data elements in the cache are not updated or refreshed on a somewhat regular basis, the cache will become stale. For this reason, the application server runs a timer to periodically request and update or refresh the data elements in the cache from the Sybase server. In one embodiment, this timer/refresh cycle is a LiteQuery cache manager. This manager thread runs every 10 minutes and different caches may have different refresh cycles, some as frequently as every 10 minutes and others less frequently, such as only once a day. Each time the manager thread runs, it checks to see if any of the cache refresh cycles are due. In one embodiment, upon each refresh cycle, the entire cache is refreshed. In another embodiment, only changes to the cache are made, and the entire cache is not refreshed. Some of these aspects are not illustrated in the figures. The concept of refreshing an existing cache is different from initializing or creating a cache.

It is also possible for the cache update or refresh to be handled in a manner similar to browser notification, described elsewhere, where the cache is updated when the Sybase notification server sends a notice of update, and a cache bean monitors the Sybase notification server.

The LiteQuery cache does not include all of the elements associated with a data record type stored in the Sybase server. As an example, the data record for a particular trading party that is maintained within the Sybase server is likely to include a significant amount of information. Much of that information is needed by a client on a very infrequent basis, but the user needs some information, such as the party name for trades involving that party. Therefore, in one embodiment, the cache includes a limited subset of the full data record held by the Sybase server. The minimum information contained within the LiteQuery cache is a record ID and a string variable. The term LiteQuery cache therefore comes from the concept of using a thin cache that does not include all of the elements in the data record. The string variable and record ID from the LiteQuery cache are both passed to the client browser. The string variable is displayed to the client user. The record ID is held by the browser and allows the application server and Sybase server to locate or retrieve additional information on that particular ID when or if the client user requests it. In this manner, the amount of information exchanged between the application server and the client browser is reduced. Details of this aspect of the invention are described elsewhere in greater detail.

At steps 318, 320, notification manager 114 of application server 104 and notification server 110 of Sybase server 102 establish a connection. Once the connection is made, notification manager 114 of application server 104 registers with notification server 110 of Sybase server 102 for the required notifications. In one embodiment of the invention, the notifications are for dynamic types of data, such as deals with notifications for deal add, deal delete, and deal update. In other embodiments of the invention, the notifications include other data types. Some notifications include static data types, such as parties, counterparties, countries, and currencies with notification of add, delete and update of these data types.

At step 322, notification manager 114 of application server 104 starts three Java beans. These beans are an add bean, a delete bean and an update bean.

At step 324, application server 104 determines whether any client browsers 106 are connected to application server 104 and have requested notification. If no client browsers are connected or request notification, application server 104 loops or waits until there is a connection by a client browser or change notification.

At step 326, notification manager 114 of application server 104 transmits or broadcasts the heartbeat message to client browser 106. This transmission is over a TCP socket connection and is described in greater detail below.

As long as a TCP socket connection exists between the application server and at least one client browser 106, the heartbeat message will be broadcast to all active client browsers 106 that have a TCP socket connection. When a client browser times out or terminates their session, the TCP socket connection is lost and that client browser is removed from the list of active clients.

At step 328, notification manager 114 of application server 104 waits for a notification from Sybase notification server 110 of Sybase server 102. The notification that notification manager 114 waits for at step 328 is one of the notifications registered at steps 318, 320.

Once application server 104 and Sybase server 102 are initialized, as illustrated in FIG. 3, and described above. A client browser 106 can connect to application server 104.

Figure 4B:
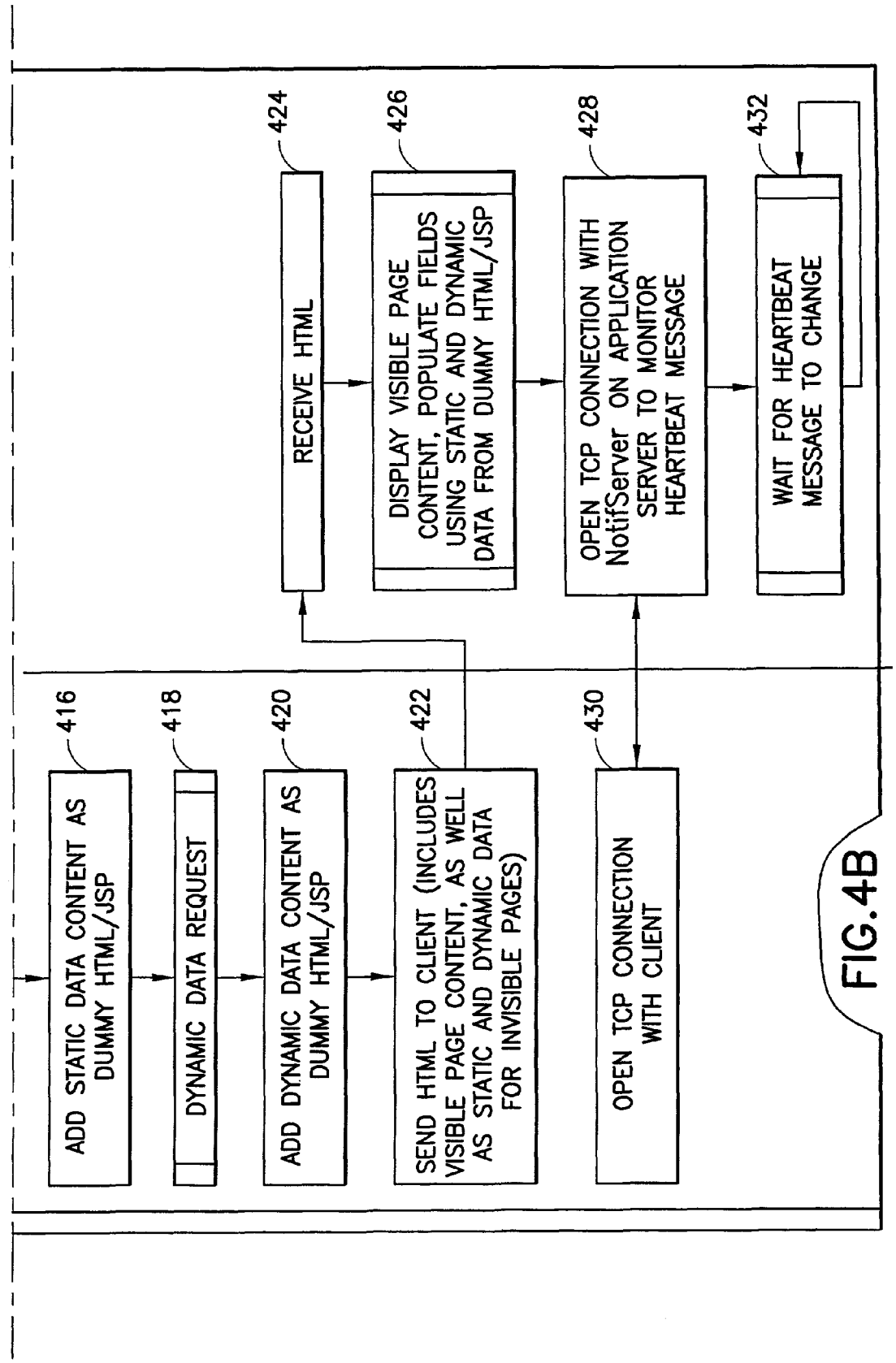

Referring now to FIGS. 1, 2 and 4, at step 402, application server 104 is initialized and running, with the notification manager 114 generating heartbeat messages.

At step 404, client 106 loads and starts a browser application. In one embodiment, the browser is INTERNET EXPLORER, by Microsoft Corp. of Redmond Wash. In another embodiment the browser is NETSCAPE, by Netscape Communications Corp. of Mountain View Calif. Other browsers are known and appropriate for the invention.

At step 406, the user of client browser 106 logs in to the requested application server 104 and obtains browser session credentials. In one embodiment the log-in is for a single session sign-on, and the browser session credential is used with multiple applications, without the need for the user to log-in again.

At step 408, client browser 106 requests a specific application resource from application server 104 via http.

At step 410, application server 104 receives the request for a resource, and begins to generate a response to the request.

At step 412, application server 104 generates content for the visible portion of the web page response, and adds this portion to the HTML response. The visible portion may include multiple layers, some of which are displayed in front of other layers. The browser moves various layers to the front for visibility or toward the back to make another layer visible.

Figure 5:
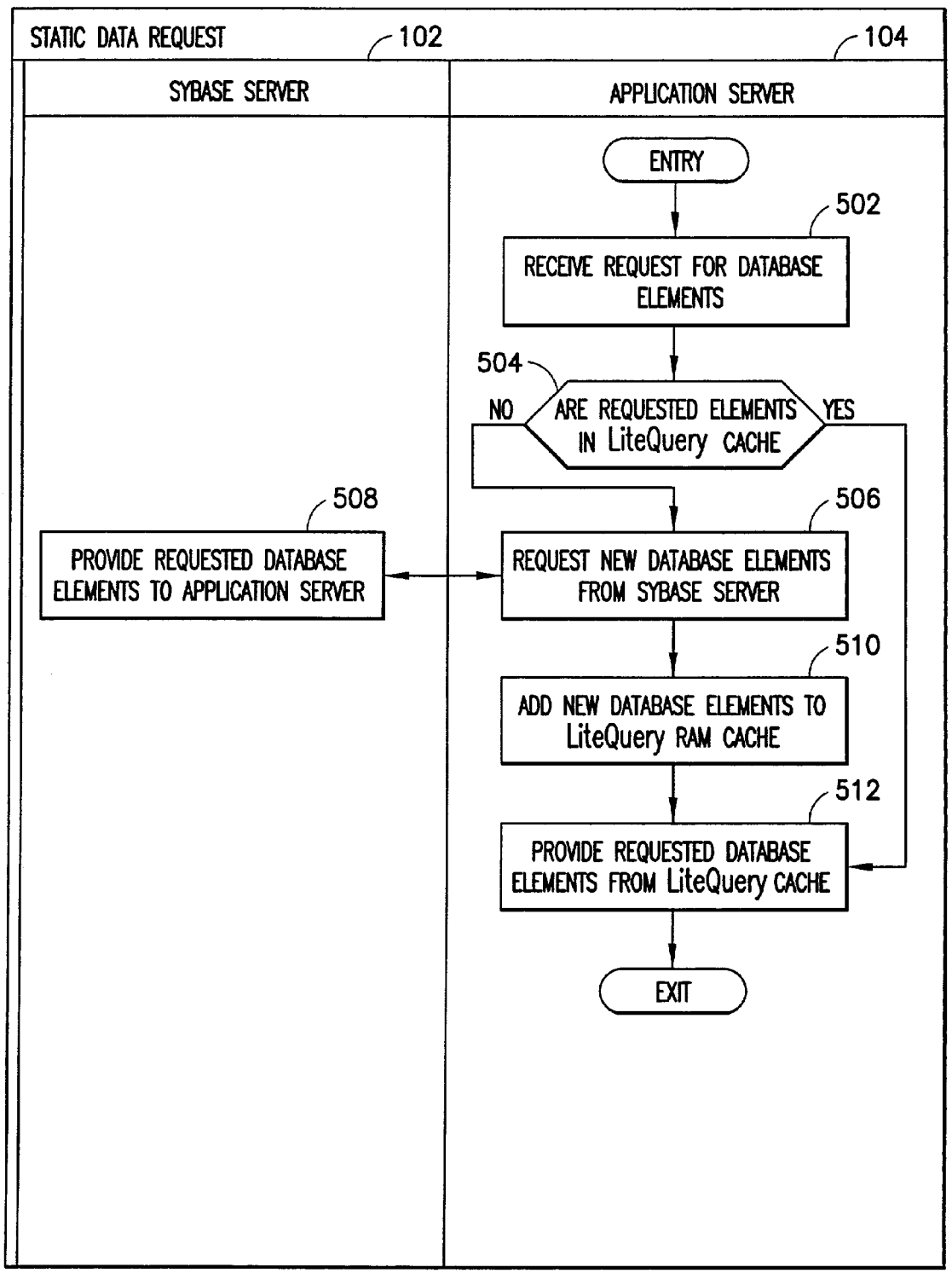
FIG. 5 illustrates steps in a method according to one embodiment of the invention.

At step 414, application server 104 makes a request for static data. This request may include multiple steps, which are illustrated in FIG. 5 and described more fully below.

At step 416, application server 104 adds the static data content to the HTML response as dummy HTML/JSP. This static data will be included in an invisible frame (204 of FIG. 2).

Figure 6:
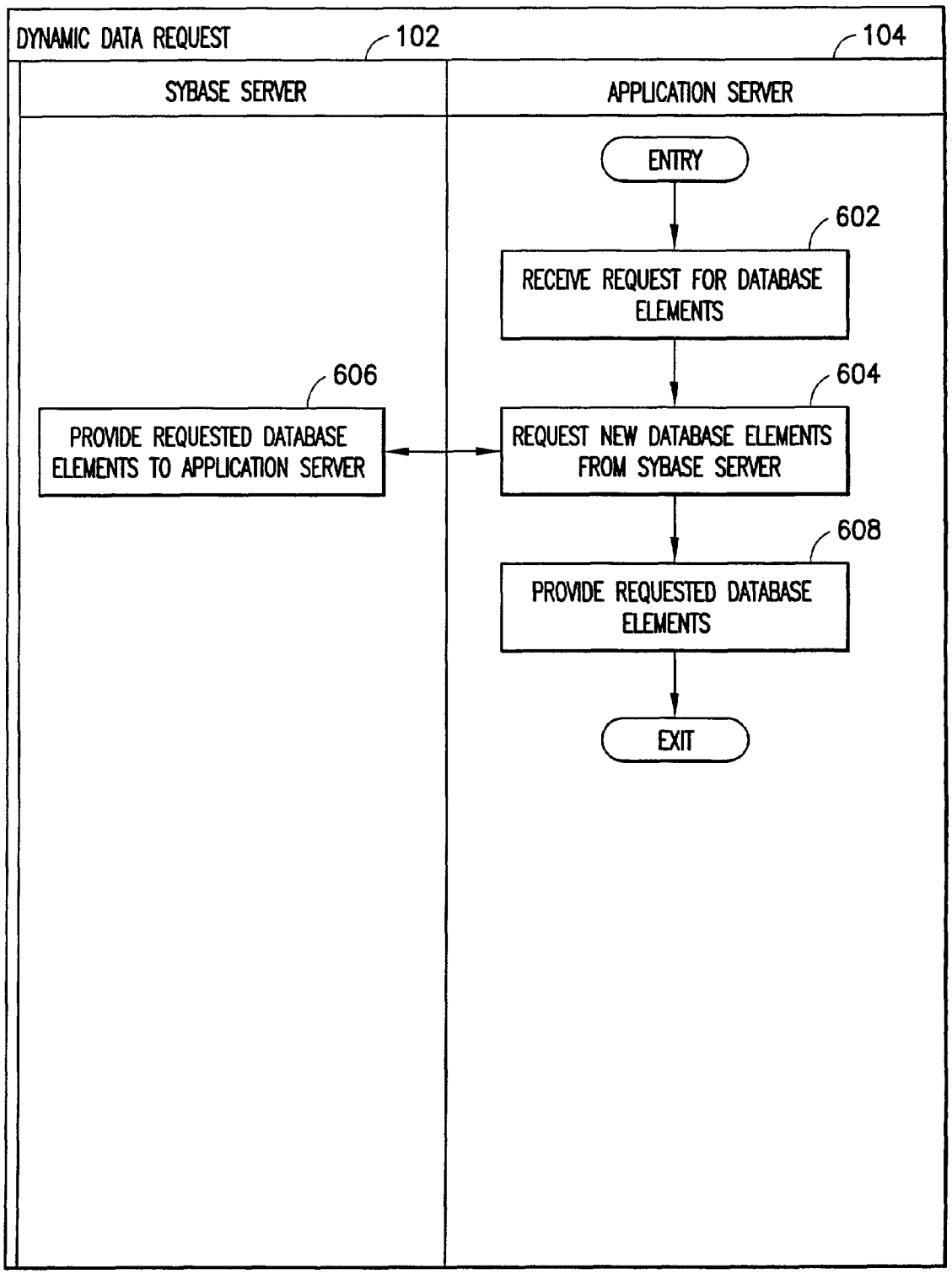
FIG. 6 illustrates steps in a method according to one embodiment of the invention.

At step 418, application server 104 makes a request for dynamic data. This request may include multiple steps, which are illustrated in FIG. 6 and described more fully below.

At step 420, application server 104 adds the dynamic data content to the HTML response as dummy HTML/JSP. This dynamic data will be included in an invisible frame (202 of FIG. 2).

At steps 422, 424, application server 104 sends the HTML response to client browser 106. The HTML includes the visible content (including multiple layers) (206 of FIG. 2), and dummy HTML/JSP for invisible frames (202 and 204 of FIG. 2).

Figure 7:
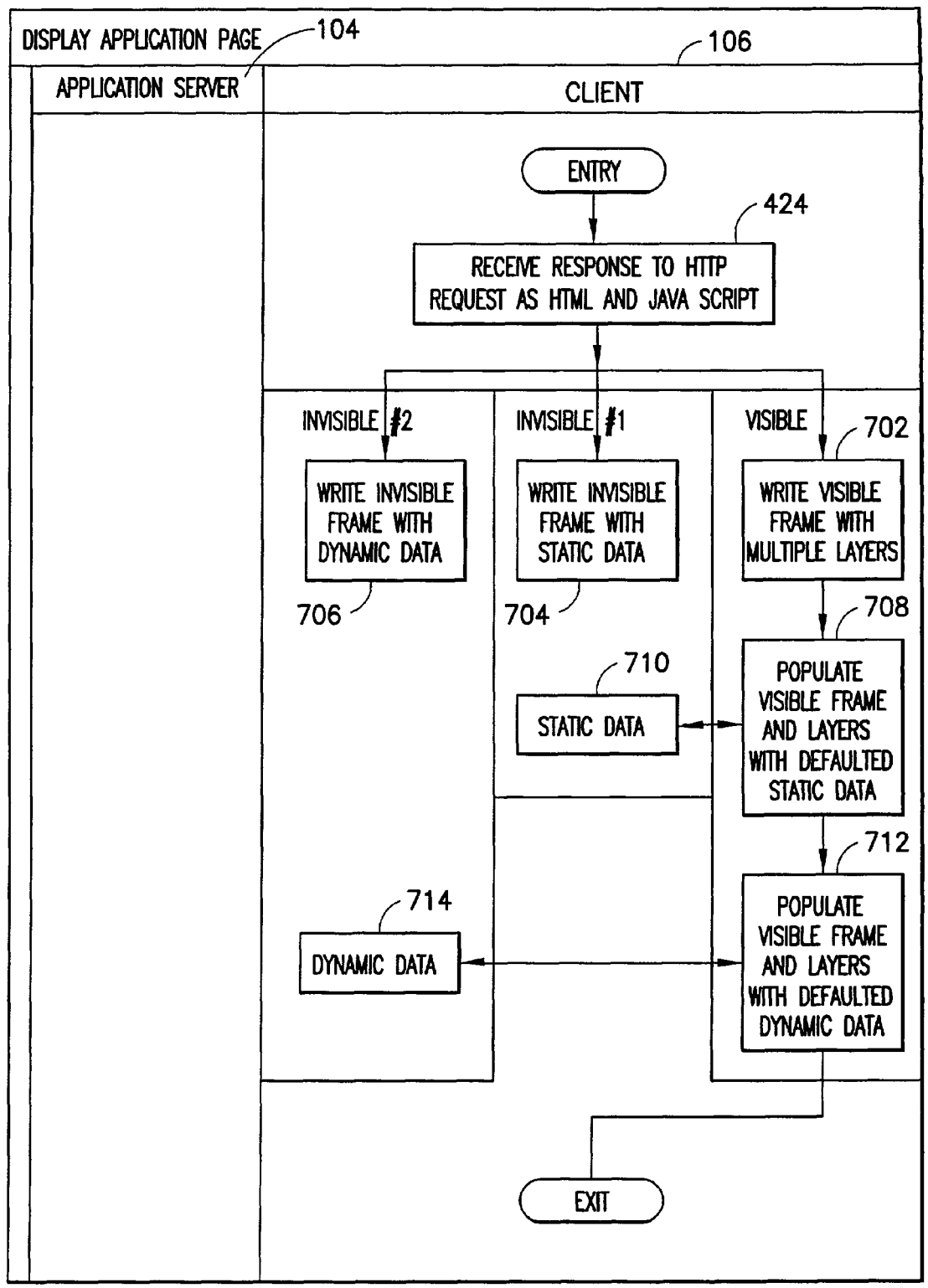
FIG. 7 illustrates steps in a method according to one embodiment of the invention.

At step 426, client browser 106 reads the HTML of the response and renders the layers of the visible page content (206 of FIG. 2), as well as the invisible frames with static (204 of FIG. 2) and dynamic (202 of FIG. 2) data. Step 426, displaying the page, may include multiple steps, which are illustrated in FIG. 7 and described more fully below.

Once client browser 106 renders the initial web page at step 426, then at steps 428, 430, client browser 106 opens a TCP socket connection with the notification server 114 of application server 104. One purpose of this TCP connection is to provide a path for the heartbeat message.

Figures 11, 11A:
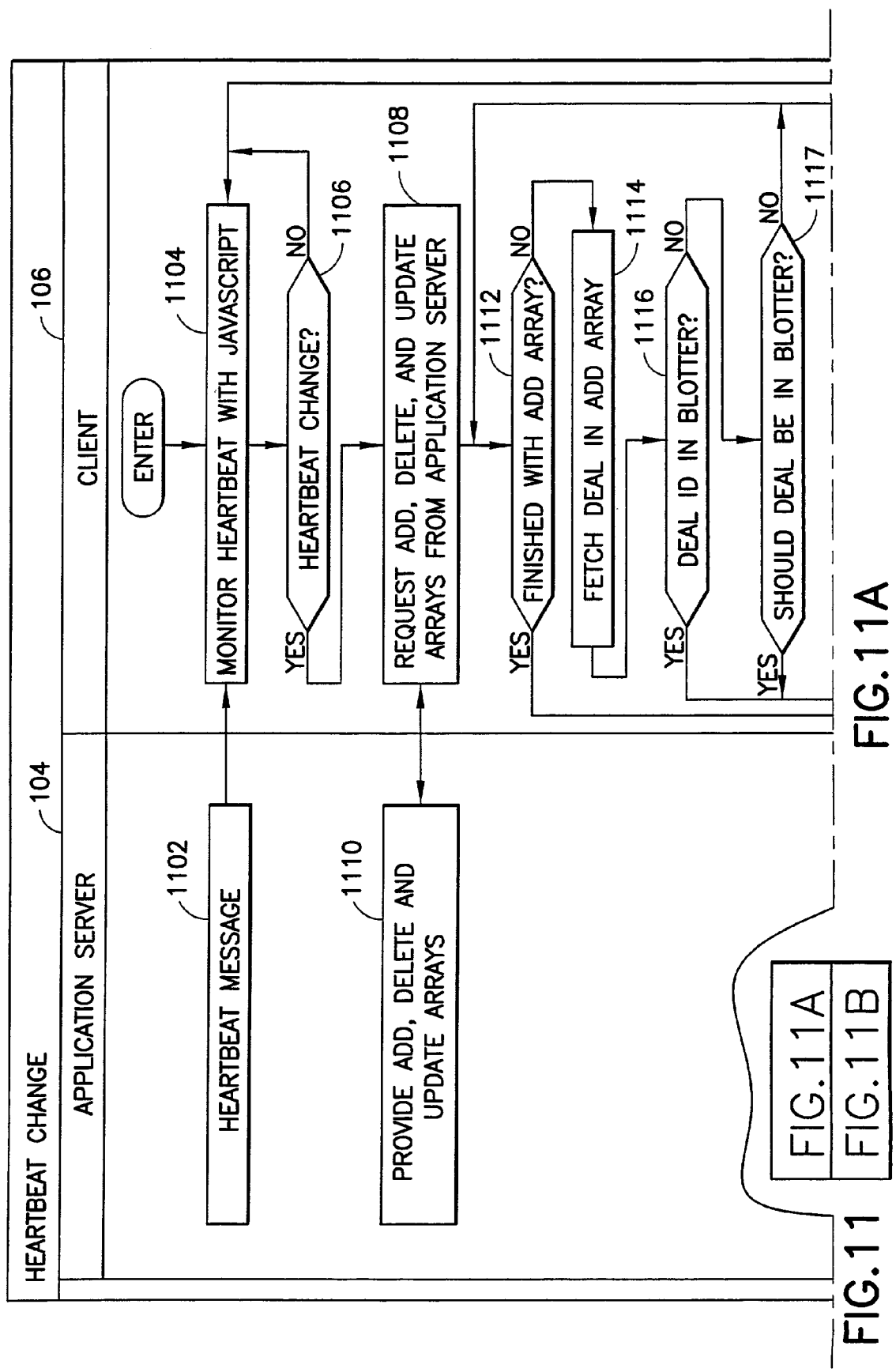
FIGS. 11A and 11B illustrate steps in a method according to one embodiment of the invention.
Figure 11B:
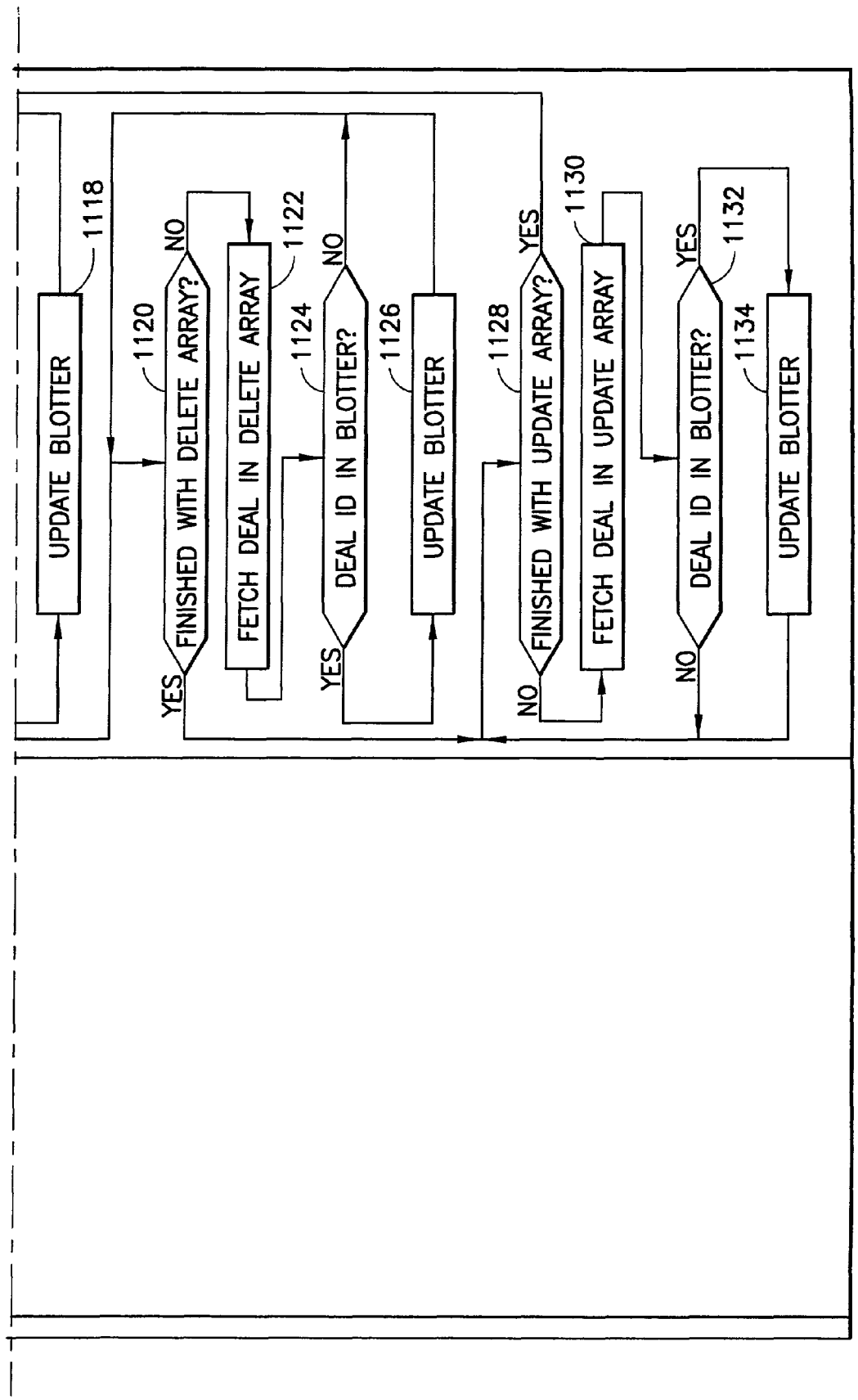

At step 430, client browser 106 monitors or waits for changes in the heartbeat message. Waiting for changes in the heartbeat message may include multiple steps, some of which are illustrated in FIG. 11 and described more fully below.

Referring now to FIG. 5, the request for static data at step 414 of FIG. 4 begins at step 502 with a request to application server 104 for database elements.

At step 504, application server 104 determines whether the requested database elements are present in the LiteQuery cache.

If the requested database elements are present in the Lite-Query cache, then at step 512, application server 104 provides the requested database elements from the LiteQuery cache.

If the requested database elements are not present, then at steps 506, 508, application server 104 requests the static database elements from Sybase server 102. This part of the lazy initialization is described elsewhere.

At step 510, application server 104 adds the static database elements to the LiteQuery random access memory (RAM) cache.

At step 512, application server 104 provides the requested database elements from the LiteQuery cache.

Although the LiteQuery cache is a thin cache, it will generally include more data records than any particular client browser will use. This is because the profile of a particular user will limit the trades and deals that user has access to. For this reason, the client browser will only see some of the records held by the LiteQuery cache.

Additionally, the user of client browser 106 is normally interested in a small quantity of information from an entire data record. For example, the data record held by Sybase database 108 for a party or counterparty may include their address information, in addition to many other fields. The user of client browser 106 is likely only interested in the name of the party or counterparty. Therefore, the information held by the LiteQuery cache and sent to the client browser includes only the string variable for the name, and a record ID. The party or counterparty name is displayed to the user of client browser 106, and the record ID is kept and used to uniquely identify that particular party or counterparty. The record ID allows the browser and application server to get additional information on the party or counterparty from Sybase database 108. The record ID also allows the information in a trade commit to uniquely identify the party or counterparty.

Referring now to FIG. 6, the request for dynamic data at step 418 of FIG. 4 begins at step 602 with a request to application server 104 for database elements.

Dynamic data is generally not stored in the LiteQuery cache, so at steps 604, 606, application server 104 requests the dynamic database elements from Sybase database 108 of Sybase server 102.

At step 608, application server 104 provides the requested dynamic database elements.

Referring now to FIG. 7, rendering the application screen at step 426 of FIG. 4 begins with client browser 106 writing a visible frame, including multiple layers (206 of FIG. 2); an invisible frame with static data (204 of FIG. 2); and an invisible frame with dynamic data (202 of FIG. 2) at steps 702, 704, 706 respectively.

Use of an invisible frame and applet (202 of FIG. 2) provides certain advantages. One advantage is that no plug-in or swing components are required, and there are no display widgets. The applet is responsible for maintaining the TCP socket connection. Javascript monitors the instance variable to determine whether the heartbeat message has changed from "heartbeat" to "refresh."

At steps 708, 710, the visible frame populates the fields in the various layers that require static information using the default static information that is contained within that respective invisible frame (204 of FIG. 2).

At steps 712, 714, the visible frame populates the fields in the various layers that require dynamic information using the default dynamic information that is contained within that respective invisible frame (202 of FIG. 2).

As illustrated in FIG. 4, upon initial client connection, client browser 106 waits for the heartbeat message to change at step 430 after opening the TCP connection at steps 428, 430.

Figure 8:
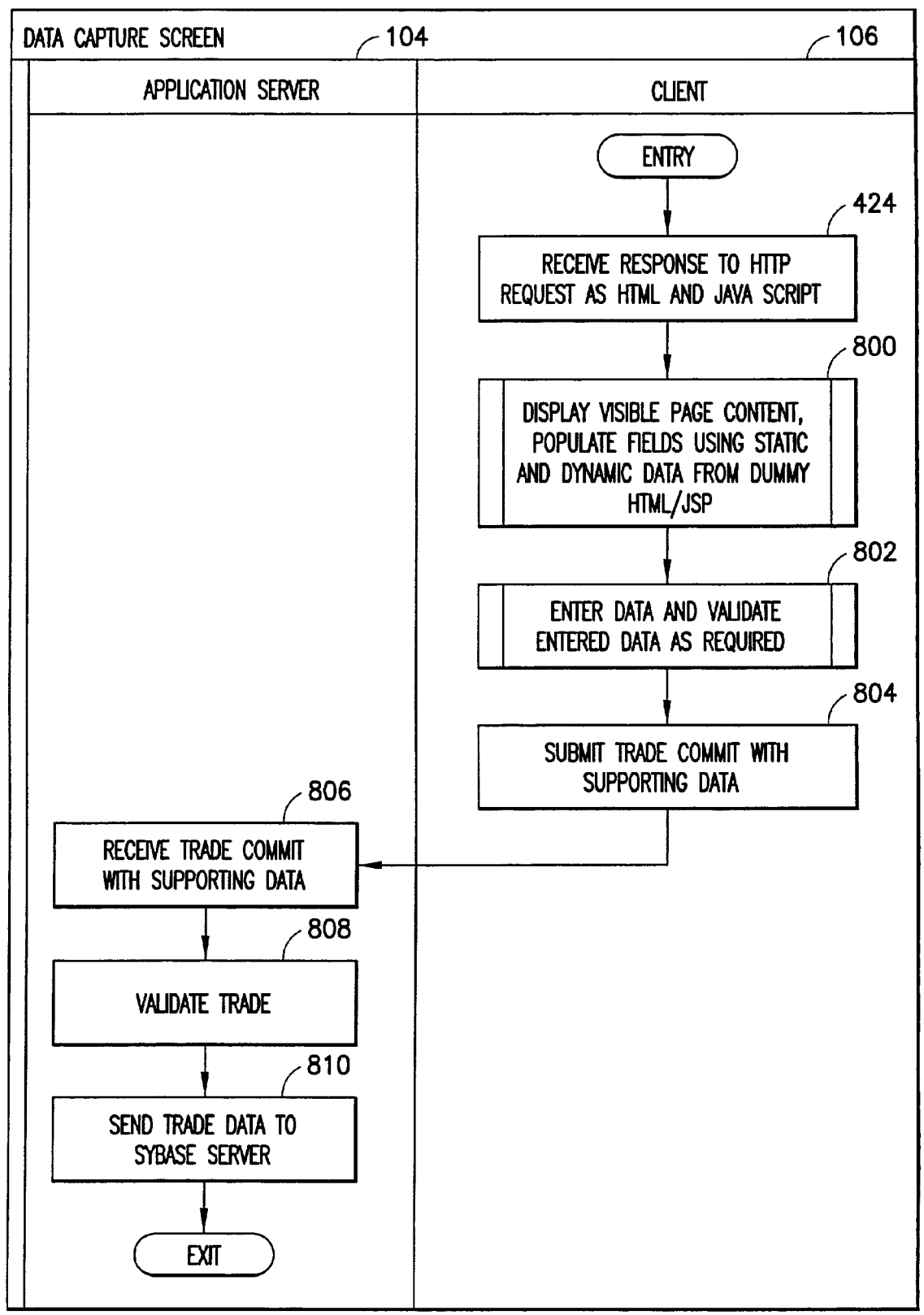
FIG. 8 illustrates steps in a method according to one embodiment of the invention.
Figure 9:
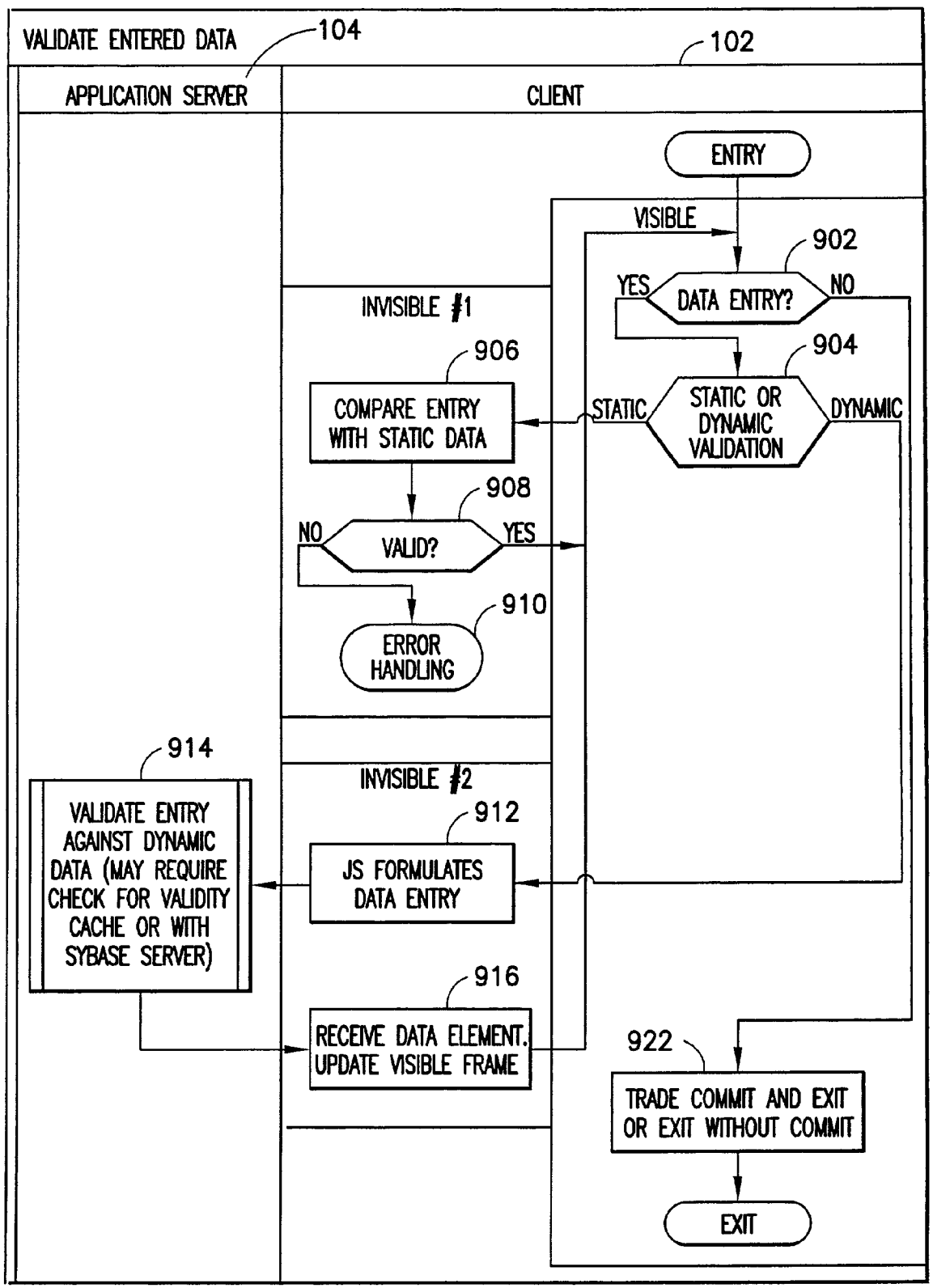
FIG. 9 illustrates steps in a method according to one embodiment of the invention.

Referring now to FIG. 8 in most operations, shortly after client browser 106 renders the display page (step 800), the user will begin to request further information and make trades using that information. At step 802, when the user enters or selects data on the display screen, some of the information is validated. Step 802 includes multiple steps, some of which are illustrated in FIG. 9.

At step 804, the user of client browser 106 submits a trade commit, which includes supporting data.

At step 806, application server 104 receives the trade commit with supporting data, and at step 808, validates the trade.

At step 810, application server 104 sends the trade data to Sybase server 102, where it is stored.

Referring now to FIG. 9, the steps for validation of data at step 802 of FIG. 8 are more fully described.

At step 902, client browser 106 determines whether the action is a data entry, as compared to a trade commit or exit without commit.

If the action is data entry, then at step 904, client browser 106 determines whether the entry requires validation against static data that is held by the respective invisible frame (204 of FIG. 2), or validation against dynamic data that is available through the respective invisible frame (202 of FIG. 2).

Figure 12:
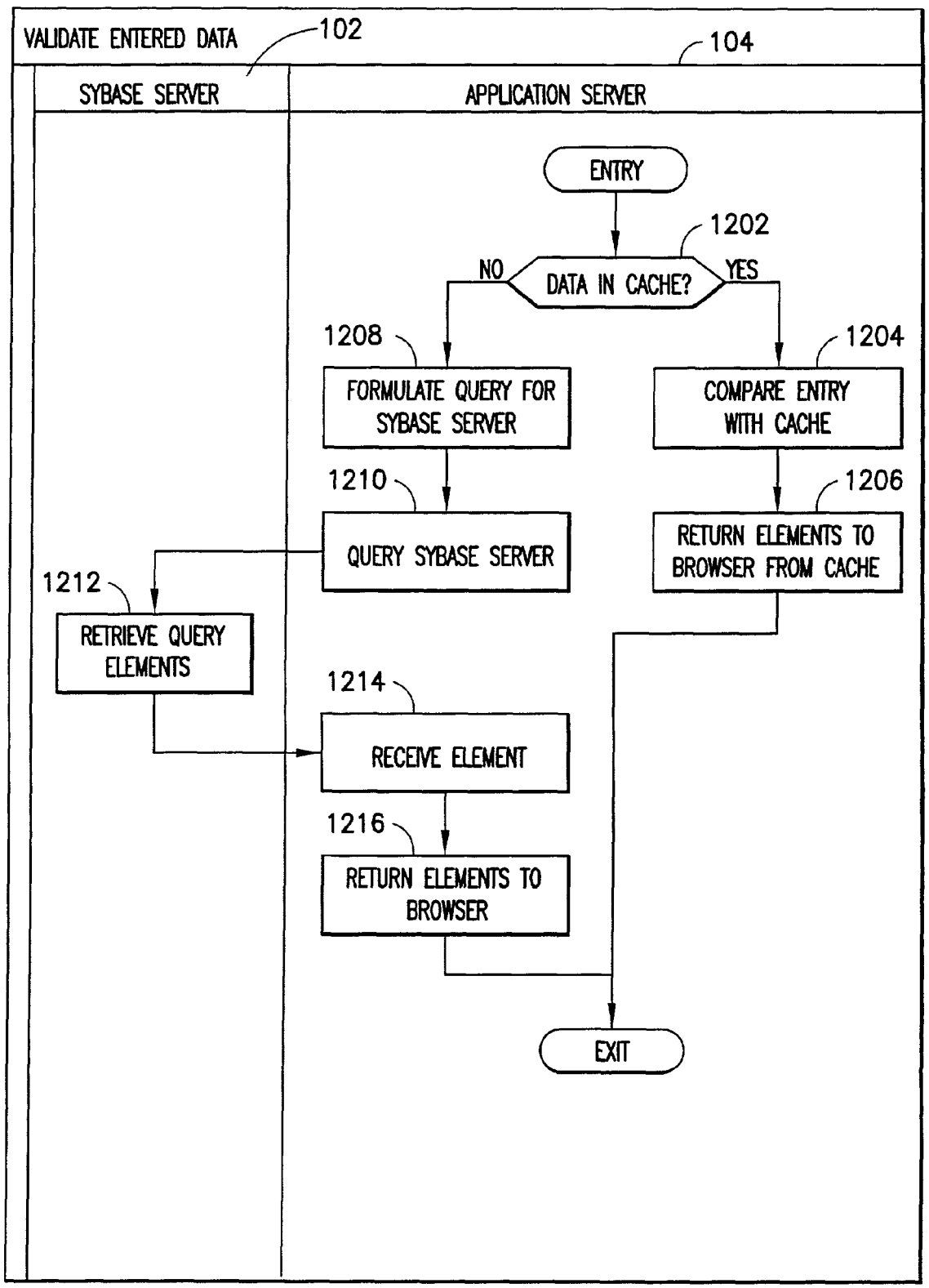
FIG. 12 illustrates steps in a method according to one embodiment of the invention.

If static data, then at steps 906, 908, the data entry is compared or validated against static data. If the data entry is not valid, then at step 910, the user of client browser 106 is given an opportunity to correct the data entry and update the visible frame. The validation performed at step 914 includes multiple steps, which are illustrated in FIG. 12.

If at step 904, client browser 106 determines that the data entry requires validation against dynamic data, then at step 912, client browser 106 determines whether the data entry requires validation against dynamic data that is held by the respective invisible frame (202 of FIG. 2) or validation against data available from application Server 104. Then at steps 914, 916, client browser 106 and application server 104 validate the entry and update the visible frame. The validation performed at step 914 includes multiple steps, which are illustrated in FIG. 12.

In addition to validation of dynamic data, it is possible to use the connection from the client to the application server and potentially to the Sybase server to assist with data selection. As an example, the user wants to select an asset and knows that the asset name begin with the letter B. When they enter the letter B into the field for asset and then press the enter key or tab out, javascript within the browser creates a query and passes that query to the application server with instructions to search the LiteQuery asset cache for all assets beginning with the letter B. For ease of description, this query is called a Memory filter LiteQuery. The application server is able to determine whether sufficient information is present within the LiteQuery asset cache to conduct the search, and if not formulates the search to access the Sybase database. The search result, which consists of all assets that begin with the letter B is then returned to the client browser and that set of assets that begin with the letter B is used to populate a pickbox on a layer of the visible frame of the browser.

In this way, the client browser 106 formulates a search and sends that search to the application server 104. The client browser 106 does not need to know how to conduct the search, only that the search is in assets and what the criteria is. The application server 104 knows how to conduct the search of the LiteQuery asset cache and also knows whether the type of information will be found in the LiteQuery asset cache, or whether the type of information must be found in Sybase database 108.

Another variation of validation is where data in two fields are related by a dynamic value. An example is where the denomination for a particular type of trade is in Argentine pesos, and another field on the trade blotter indicates the face amount in U.S. dollars. When the user enters the quantity in Argentine pesos, the javascript in the client browser 106 goes cut to the application server 104, which may go to the Sybase server 102 if necessary, to retrieve the current FX rate. That rate is returned to the client 106 and the javascript uses that rate to calculate the face amount in U.S. dollars and then display that amount in the respective field of the trade blotter.

At step 922, client browser 106 determines whether the action is a trade commit and exit, or exit without commit.

In the steps illustrated in FIG. 9, the steps are described as checking for validity of entered data. However, it is equally likely that instead of the user merely entering raw data that is then validated, the user is presented with choices for data selection. These various embodiments are described in greater detail below.

For example, in one data field, the user may be provided with a list box of countries. The countries are part of the static data that is stored in the respective invisible frame (204 of FIG. 2). That list of countries is used to populate the list box. Therefore, rather than "validate" the user entry of a particular country, the user is provided with a list box of valid countries to choose from. As long as the user's selection of a country comes from that list box, the entry will be valid. Therefore, in this embodiment, the range of possible data that might be entered is "validated" before the user selects it.

In another example, the range of possible security instruments is static data that is held within the respective invisible frame (204 of FIG. 2). The number of possible security instruments may be very large and use of a list box to display all of the instruments is not an ideal way to present the information. Therefore, the user of client browser 106 is provided with a blank data entry field, and as soon as they begin to type or enter data into the field, the possible security instruments that will match the data entry begins to narrow. As the user enters each character, the range of matching instruments is reduced until only one possible match is left, which the user selects. Alternatively, as the user enters characters, they are left with a smaller list of possible matching instruments, from which they select the desired instrument. This technique is different from the traditional list box technique of most existing browsers.

With the list box of existing client browsers, when the user types the first letter, the list box scrolls immediately to the first item in the list box that matches that letter. In order for the user to scroll down in the list box, they must either continue to enter the same letter or use the scroll bar. For example if the user wants to select the state of New York. The user enters the letter N, and the list box jumps/scrolls to Nebraska, which is the first state in an alphabetized list of states. As the user continues to press N, the list box scrolls one state each time. (i.e., Nevada, New Hampshire, New Jersey, New Mexico, and finally New York). If the user does not continue to enter the same first letter (e.g., N), but instead enters the next letter in the name (e.g., E for the second letter of New) they are not taken to a state that has the first letters NE, but will be taken to Florida, the first state in the list box after E, certainly not what they wanted.

The validation described above involved checking entered data against static and dynamic data. Although not illustrated, the invention also uses other validation techniques, such as restricting data entry for certain fields to only certain types of data (e.g., numbers for amounts and allowable date format for dates). Many of these validation checks are performed with javascript.

Figures 10, 10A:
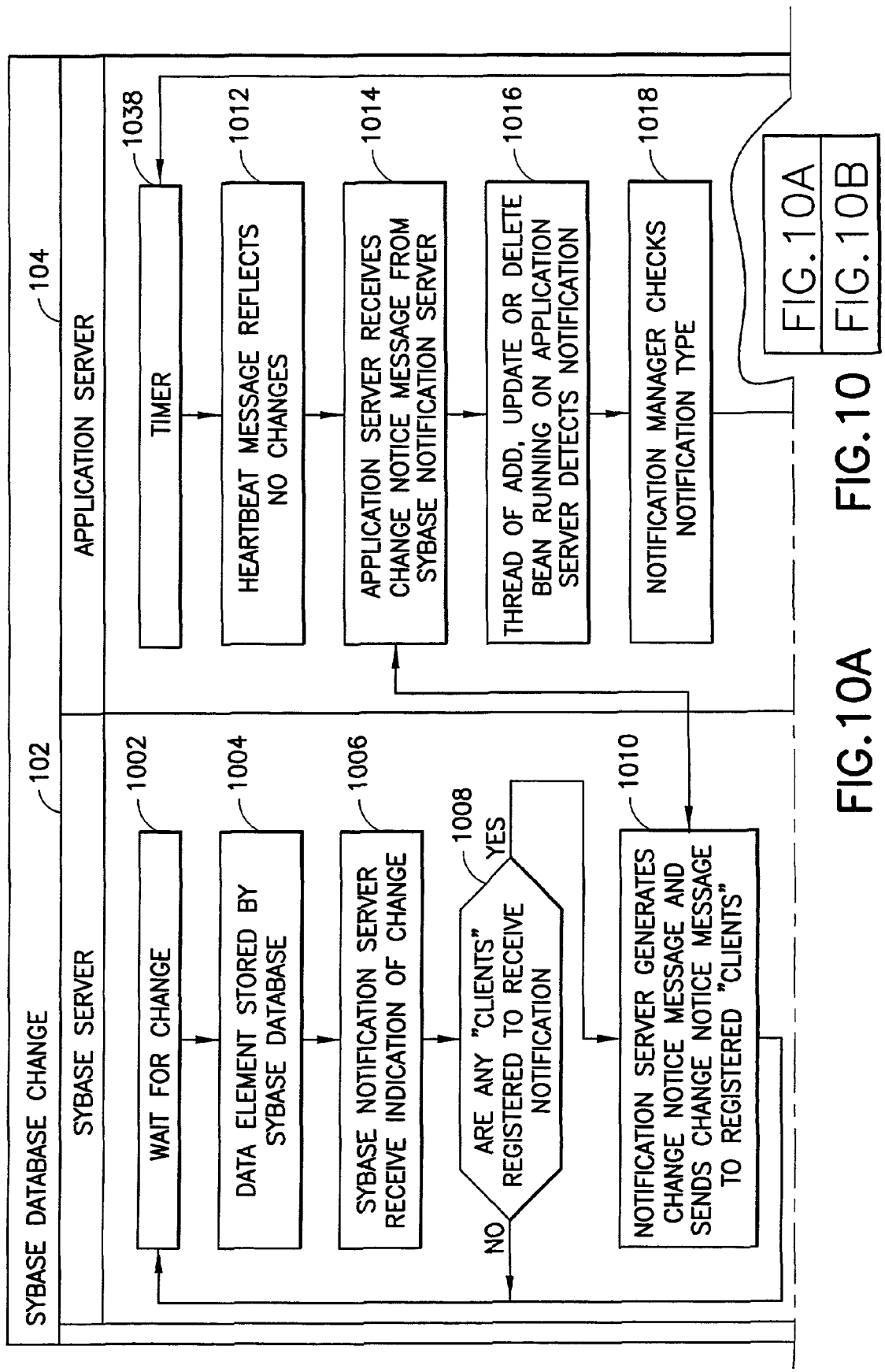
FIGS. 10A and 10B illustrate steps in a method according to one embodiment of the invention.
Figure 10B:
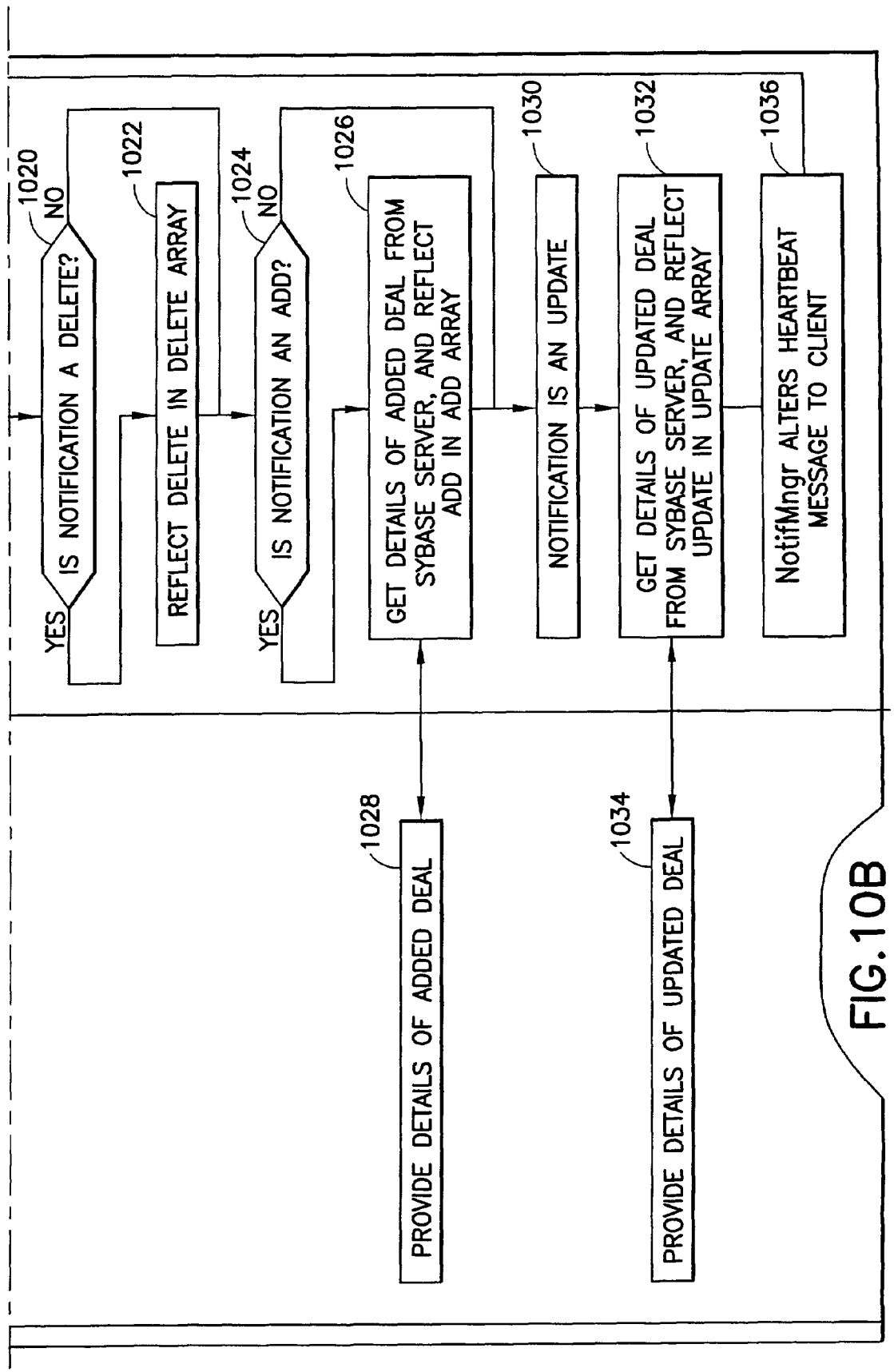

Referring now to FIG. 10, steps involving an update to Sybase server 102 are illustrated.

At step 1002, Sybase server 102 determines that there is a change to an element in the database, and at step 1004, stores the database element in Sybase database storage 108 of Sybase server 102. The storage may be any number of different types, most commonly hard disk. The data base elements are also most typically stored by a relational database. Although not illustrated, the step for storing the database element at step 1004 typically includes various rollback, backup and commit steps to ensure that database element changes are not lost, and that the database can be fully recovered in the event of a failure.

At step 1006, the notification server 110 of Sybase server 102 receives an indication of the database element change. This indication of change includes the particular record or deal ID that was added, deleted or updated.

At step 1008, notification server 110 determines whether any "clients" are registered to receive notification of the change. Here, the "client" is the application server 104. As discussed above, at steps 318, 320 of FIG. 3, application server 104 registers with notification server 110 for add, delete and update of certain database elements, such as deals. The registrations at step 318, 320 are what determines which "clients" are registered at step 1008.

If there are no "clients" registered with notification server 110 for the database change, Sybase server 102 loops to step 1002 to wait for another database element change.

If there are "clients" registered with notification server 110 for the database change, then at step 1010, Sybase server 102 generates the change notice message and sends that change notice message to the registered "clients." Sybase server 102 then loops to step 1002 to wait for another database element change.

During the time that Sybase server 102 is waiting for changes in the database, and then sending notice of the change to registered "clients," application server 104 is performing other operations, which include sending a heartbeat message at step 1012 to client browser 102. Until a change in the Sybase server is made and notice of that change is sent to application server 104, the heartbeat message reflects no changes.

When the notification server 110 of Sybase server 102 sends the change notice message at step 1010, the message is received by application server 104 at step 1014, assuming that application server 104 is registered as a "client" to receive notice of the change.

If a change notice message is received by application server 104, then at step 1016, a thread of add, update and delete java beans running on application server 104 detect the change notice message. The change notice message that is sent at step 1010 includes the deal ID, but does not include all of the particulars of the deal. Therefore, where application server 104 needs those particulars, the application server uses the deal ID to submit a request to the Sybase server and retrieves the particulars for the deal.

At step 1018, notification manager 114 of application server 104 checks the type of change notice message. For example, the change notice may be add, delete or update.

At step 1020, notification manager 114 determines whether the change notice message is a delete. If the change notice message is a delete, then at step 1022 delete of that deal or data element is reflected in the delete array, which is held by application server 104.

At step 1024, notification manager 114 of application server 104 determines whether the change notice message is an add. If the change notice message is an add, then at steps 1026, 1028, application server 104 gets information on the added deal or added data element from Sybase server 102, and reflects the added deal or added data element in the add array, which is held by application server 104.

At step 1030, notification manager 114 of application server 104 determines that the change notice message is an update. Then at steps 1032, 1034, application server 104 gets information on the updated deal or updated data element from Sybase server 102, and reflects the updated deal or data element in the update array, which is held by application server 104.

After the add, delete and update deals are reflected in the respective arrays, then at step 1036, notification manager 114 of application server 104 changes the heartbeat message to "refresh" to reflect the change in the Sybase server and sends the "refresh" message to client browser 102.

At step 1038, there is a timer running within notification server 116 of application server 104. Every minute, a thread on each of the add, delete and update beans running in notification server 116 checks the respective arrays to determine, from the timestamp associated with each deal, whether any of the changes to deals reflected in the respective arrays are more than five (5) minutes old. If any of the changes in an array are more than 5 minutes old, that deal ID and associated information is removed from the array. This ensures that each array holds no more than 5 minutes of deals. Sybase database 108 maintains a record of all deals.

Referring now to FIG. 11, steps involving the heartbeat message are illustrated. At step 1102, application server 104 sends a heartbeat message to client browser 106. The heartbeat message is received over the TCP socket connection that was established at steps 428, 430 in FIG. 4. At a minimum, the heartbeat message reflects change or no change.

At step 1104, the applet in the hidden frame (202 of FIG. 2) running on client browser 106 receives the heartbeat message over the TCP socket connection. Within that applet is an instance variable that is set depending on what the heartbeat message says. The javascript polls the applet for the instance variable.

At step 1106, the javascript determines from the instance variable whether the heartbeat message reflects a change. In one embodiment, the heartbeat message becomes "refresh" to reflect the change. If the heartbeat message reflects no change, the javascript within the applet loops to step 1104 to continue monitoring the instance variable.

If the heartbeat message reflects a change, then at steps 1108, 1110, the javascript of client browser 106 causes client browser 106 to make an http request to application server 104 to request the add, delete and update arrays, and in response, the client browser receives the respective arrays that have been added, deleted or updated within the last five (5) minutes. The added and updated deal arrays have complete deal information. The delete deal array has deal ID but no other information.

At step 1112, javascript running on client browser 106 begins a series of decisions and actions to process the deals in the respective arrays against the deals that are currently displayed.

At step 1112, client browser 106 determines whether there are unprocessed deals in the add deal array. If all deals in the add deal array have been processed, then at step 1120, client browser 106 determines whether there are unprocessed deals in the delete deal array.

If there is an unprocessed deal in the add deal array, then at step 1114, client browser 106 fetches that deal.

At step 1116, client browser 106 uses the deal ID from the add deal array to determine if the deal is reflected in the blotter.

If the deal is in the blotter, then at step 1118, the blotter is updated from the add deal array.

If the deal is not in the blotter, then at step 1117, client browses 106 determines whether the deal should be in the blotter. If the deal should be in the blotter, the blotter is updated from the add deal array.

At step 1112, client browser again determines whether there is an unprocessed deal in the add deal array.

If there are no more unprocessed deals in the add deal array, then at step 1120, client browser 106 determines whether there are unprocessed deals in the delete deal array. If all deals in the delete deal array have been processed, then at step 1128, client browser 106 determines whether there are unprocessed deals in the update deal array.

If there is an unprocessed deal in the delete deal array, then at step 1122, client browser 106 fetches that deal.

At step 1124, client browser 106 uses the deal ID from the delete deal array to determine if the deal is reflected in the blotter.

If the deal is in the blotter, then at step 1126, the blotter is updated from the delete deal array.

At step 1120, client browser again determines whether there is an unprocessed deal in the delete deal array.

If there are no more unprocessed deals in the delete deal array, then at step 1128, client browser 106 determines whether there are unprocessed deals in the update deal array. If all deals in the update deal array have been processed, then at step 1104, client browser 106 monitors the heartbeat message.

If there is an unprocessed deal in the update deal array, then at step 1130, client browser 106 fetches that deal.

At step 1132, client browser 106 uses the deal ID from the update deal array to determine if the deal is reflected in the blotter.

If the deal is in the blotter, then at step 1134, the blotter is updated from the update deal array.

At step 1128, client browser again determines whether there is an unprocessed deal in the update deal array.

Although illustrative embodiments have been described herein in detail, it should be noted and will be appreciated by those skilled in the art that numerous variations may be made within the scope of this invention without departing from the principle of this invention and without sacrificing its chief advantages.

For example LiteQuery caching and browser notification are concepts that can be used independent of each other. Alternatively, the two concepts can be used together as described herein.

The invention has been described with reference to illustrations of generally serial or synchronous transactions. However, it is understood that many of the transactions are not serial or synchronous, but are infact asynchronous. Therefore, one transaction may not occur until it is triggered by another transaction.

The browser notification has been described with reference to deals, which are dynamic events. To accomplish browser notification of deals, the application server registers with the Sybase notification server 110 for add, update and delete actions on deals. It is possible to use the same type of browser notification for less dynamic transactions, such as add, delete and update of parties.

Browser notification has been described using Sybase notification server 110. However, it is also possible that changes to the litequery cache generate a change message and the change message is used in a manner that is similar to the notification message from Sybase notification server 110. In particular, a heartbeat type message is used to broadcast a change in data stored in the litequery cache, and upon receipt of the heartbeat type message indicating a change, client browser 106 requests an update of the data that is stored in the litequery cache. In this embodiment, client browser 106 will typically request the data update from the litequery cache rather than from database 108 of Sybase server 102.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for changing information on a computer, the method comprising:
    establishing a first connection between a client and a first server;
    responsive to a request from the client to the first server, sending a set of data to the client;
    establishing a second connection between the client and a second server;
    the first server receiving a notification of a change in the set of data;
    sending a regularly repeating heartbeat message from the second server to the client over the second connection; and
    responsive to a change in content of the heartbeat message, automatically sending a request from the client to the first server over the first connection for a change in the set of data;
    wherein the heartbeat message has two states, one state indicating no change in the set of data, and the other state indicating change in the set of data.

2. The method according to claim 1, wherein the first connection uses http protocol.

3. The method according to claim 1, wherein the second connection uses TCP protocol.

4. The method according to claim 1, wherein sending the request for a change is responsive to a state of the heartbeat message indicating change in the set of data.

5. The method according to claim 1, wherein the first server and the second server are parts of a single server.

6. The method according to claim 1, wherein the set of data includes data formatted as html.

7. The method according to claim 6, wherein the html of the set of data includes code for a visible frame and code for an invisible frame.

8. The method of claim 1, wherein the client is a browser.

9. A method for notifying a client browser of a change in a set of data, the method comprising:
    establishing an http connection between the client browser and an application server;
    establishing a TCP connection between the client browser and a notification server;
    the application server receiving a notification of a change in the set of data;
    transmitting a regularly repeating heartbeat message from the notification server to the client browser using the TCP connection;
    responsive to a resource request from the client browser, sending an html file via the http connection to the client browser, the html file reflecting data at a first time;
    responsive to a change in the set of data after the first time, changing content of the heartbeat message; and
    responsive to the change in the content of the heartbeat message, sending a request from the client browser to the application server via the http connection for the changed data;
    wherein the heartbeat message has two states, one state indicating no change in the set of data, and the other state indicating change in the set of data.

10. A non-transitory computer readable storage medium having computer executable code stored thereon, the code for changing information on a client computer, the code comprising:
    code to establish a first connection between a client and a first server;
    responsive to a request from the client to the first sever, code to send a set of data to the client;
    code to establish a second connection between the client and a second server;
    code for the first server to receive a notification of a change in the set of data;
    code to send a regularly repeating heartbeat message from the second server to the client over the second connection; and
    responsive to a change in content of the heartbeat message, code to automatically send a request from the client to the first server over the first connection for a change in the set of data;
    wherein the heartbeat message has two states, one state indicating no change in the set of data, and the other state indicating change in the set of data.

11. A programmed computer for changing information on a computer, comprising:
    a memory having at least one region for storing computer executable program code; and
    a processor for executing the program code stored in the memory, wherein the program code comprises:
        code to establish a first connection between a client and a first server;
        responsive to a request from the client to the first sever, code to send a set of data to the client;
        code to establish a second connection between the client and a second server;
        code for the first server to receive a notification of a change in the set of data;
        code to send a regularly repeating heartbeat message from the second server to the client over the second connection; and
        responsive to a change in content of the heartbeat message, code to automatically send a request from the client to the first server over the first connection for a change in the set of data;
        wherein the heartbeat message has two states, one state indicating no change in the set of data, and the other state indicating change in the set of data.

12. A method for updating a client browser with information, the method comprising:
    establishing a first connection between the client browser and a first server using a http protocol;
    responsive to a request from the client browser to the first server, sending a set of data to the client browser;

establishing a second connection between the client browser and a second server using a TCP protocol;

the first server receiving a notification of a change in the set of data;

sending a regularly repeating heartbeat message from the second server to the client browser over the second connection, the heartbeat message having two states, one state indicating no change in the set of data, and the other state indicating change in the set of data; and responsive to the heartbeat message indicating a change in content in the set of data, automatically sending a request from the client browser to the first server over the first connection for a change in the set of data.

* * * * *